United States Patent
Ohnsat

(10) Patent No.: US 9,781,872 B2
(45) Date of Patent: Oct. 10, 2017

(54) TILLAGE IMPLEMENT WITH ENHANCED FRONT WHEEL SUSPENSION

(71) Applicant: Great Plains Manufacturing, Inc., Salina, KS (US)

(72) Inventor: Michael J. Ohnsat, Tipton, KS (US)

(73) Assignee: Great Plains Manufacturing, Inc., Salina, KS (US)

( * ) Notice: Subject to any disclaimer, the term of this patent is extended or adjusted under 35 U.S.C. 154(b) by 385 days.

(21) Appl. No.: 14/468,092

(22) Filed: Aug. 25, 2014

(65) Prior Publication Data
US 2015/0053440 A1   Feb. 26, 2015

Related U.S. Application Data

(60) Provisional application No. 61/870,131, filed on Aug. 26, 2013.

(51) Int. Cl.
*A01B 63/22* (2006.01)

(52) U.S. Cl.
CPC ................. *A01B 63/22* (2013.01)

(58) Field of Classification Search
CPC ......... A01B 63/22; A01B 63/16; A01B 63/00; A01B 63/18; A01B 63/002
USPC .......................... 172/421, 395, 401, 405, 407
See application file for complete search history.

(56) References Cited

U.S. PATENT DOCUMENTS

| 4,253,528 | A | * | 3/1981 | Sullivan | A01B 15/00 172/386 |
|---|---|---|---|---|---|
| 4,317,489 | A | * | 3/1982 | Steinbach | A01B 63/22 172/400 |
| 4,655,296 | A | * | 4/1987 | Bourgault | A01B 63/22 172/400 |
| 4,726,303 | A | * | 2/1988 | Degelman | A01C 7/06 111/140 |
| 6,068,062 | A | * | 5/2000 | Brueggen | A01B 73/044 172/311 |
| 6,401,832 | B1 | * | 6/2002 | Payne | A01B 63/22 172/238 |
| 8,186,449 | B2 | * | 5/2012 | Hackert | A01B 73/00 172/288 |
| 8,336,639 | B2 | * | 12/2012 | Palen | A01B 63/22 172/328 |
| 9,148,987 | B2 | * | 10/2015 | Baker | A01B 51/04 |

(Continued)

*Primary Examiner* — Matthew D Troutman
(74) *Attorney, Agent, or Firm* — Hovey Williams LLP

(57) ABSTRACT

A tillage implement has a main frame provided with power-actuated lift wheels at the rear of the frame and a pair of gauge wheels at the front of the frame. A linkage system connecting the rear wheels with the front wheels transmits the raising and lowering motion of the rear wheels to the front wheels so that the main frame remains level as it is raised and lowered by all of the wheels in unison. However, a coupling that uses an equalizing rocker bar between front and rear linkages of the linkage system permits either of the front wheels to be raised or lowered in a non-corresponding manner relative to the other front wheel as differences in terrain contour are experienced between the two front wheels. During such non-corresponding shifting of the front wheels relative to one another, movement of the two front wheels is in equal amounts but opposite directions to maintain both front wheels engaging the ground at all times and equally sharing the load.

12 Claims, 26 Drawing Sheets

(56) References Cited

U.S. PATENT DOCUMENTS

| | | | |
|---|---|---|---|
| 2006/0056910 A1* | 3/2006 | Seib | A01B 51/04 403/388 |
| 2011/0079405 A1* | 4/2011 | Hackert | A01B 73/00 172/669 |
| 2012/0111584 A1* | 5/2012 | Palen | A01B 63/22 172/1 |
| 2012/0261145 A1* | 10/2012 | Palen | A01B 63/22 172/1 |

* cited by examiner

TILLAGE IMPLEMENT WITH ENHANCED FRONT WHEEL SUSPENSION

RELATED APPLICATION

This application is related to and claims the priority benefit of prior U.S. Provisional Application No. 61/870,131 filed Aug. 26, 2013, said Provisional Application in its entirety being hereby incorporated by reference into the present specification.

FIELD OF THE INVENTION

The present invention relates generally to the field of agricultural tillage implements.

BACKGROUND AND SUMMARY

Conventional tillage implements (e.g., cultivators, disks, ploughs, chisels, and harrows) are used in a variety of different field conditions and for a variety of different purposes. Some tillage implements are specially configured to operate at high speeds and shallow depths, while other tillage implements are configured for lower speeds and deeper depths. Additionally, some tillage implements are configured to effectively traverse rough or rolling terrain, while other tillage implements are configured to operate on relatively flat ground. Often a single farming operation encounters a variety of conditions that force the farming operation to either purchase multiple types of tillage implements or to operate a single tillage implement in a less than ideal manner. Accordingly, there exists a need for a tillage implement that is effective in a variety of different field conditions and for a variety of different purposes.

The present invention provides a tillage implement that is particularly effective in avoiding the placement of untoward stresses and strains on the implement frame and other critical components of the machine as the machine traverses rough, uneven, or rolling terrain during field operations or transport to and from the field. Ground-engaging wheels of the machine are raised and lowered in unison for lifting or lowering the main frame of the machine, but in one preferred embodiment a pair of front wheels that share a portion of the load of the machine's frame can operate in a non-corresponding manner when the terrain encountered by one of the wheels differs significantly from that encountered by the other. The wheels are linked to one another in such a manner that they can shift upwardly or downwardly relative to one another in equal amounts but in opposite directions so as to maintain both wheels touching the ground and the load of the frame equalized on both of the wheels notwithstanding significant differences in the terrain under the wheels. This avoids concentrating the load on only one of the wheels, for example, such as could occur if the wheels were both locked at a fixed height relative to the frame and one of the wheels were to roll over a high spot that raised the frame and caused the other wheel to be lifted completely off the ground.

DETAILED DESCRIPTION

The present invention is susceptible of embodiment in many different forms. While the drawings illustrate, and the specification describes, certain specific embodiments of the invention, it is to be understood that such disclosure is by way of example only. The principles of the present invention are not limited to the particular disclosed embodiments.

Figure 1:
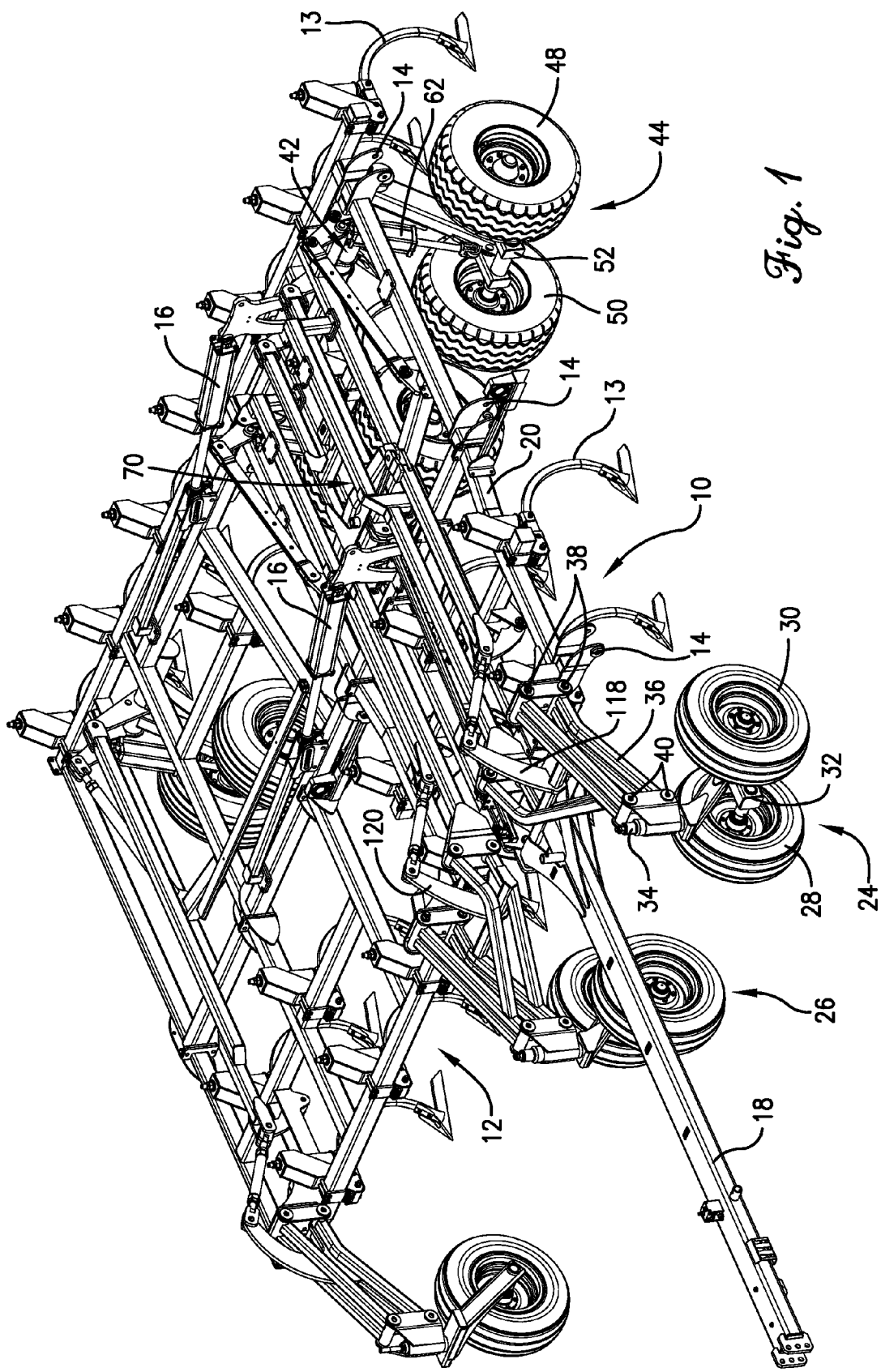
FIG. 1 is a left front isometric view of a multi-section tillage implement constructed in accordance with the principles of the present invention, the left wing section of the implement being removed for clarity.
Figure 2:
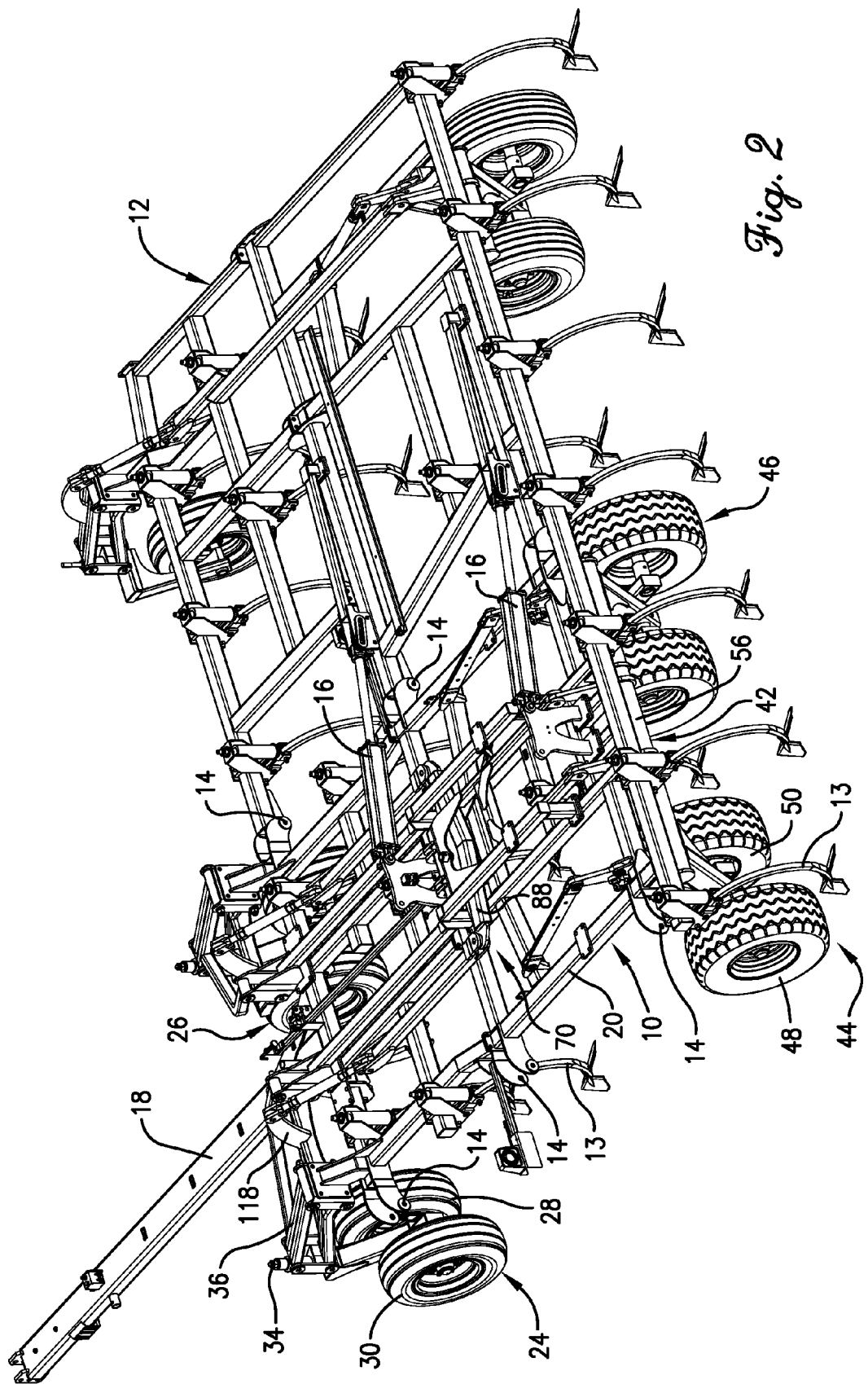
FIG. 2 is a left rear isometric view of the implement taken from above the implement.
Figure 3:
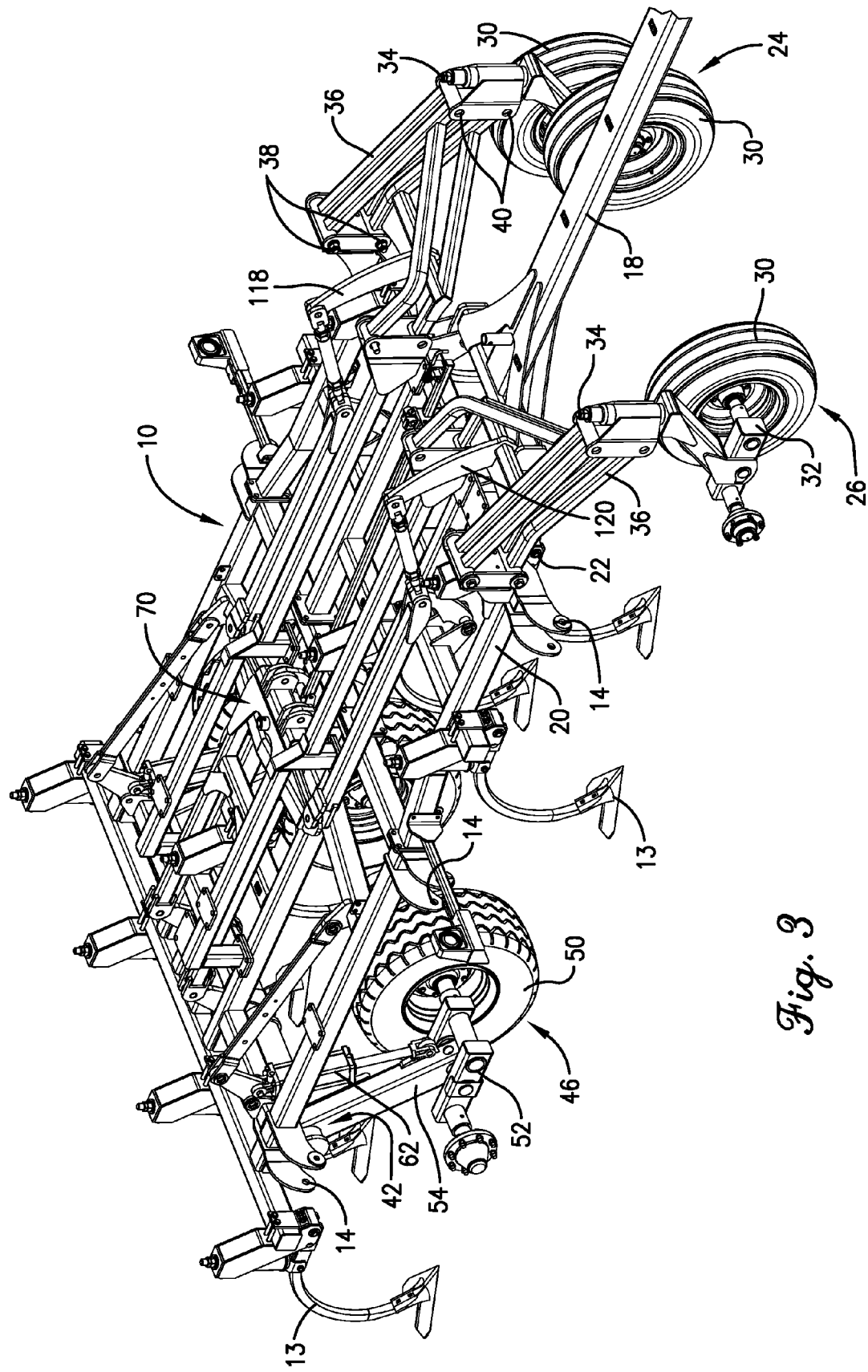
FIG. 3 is a right front isometric view of the center section of the implement, both of the wing sections being removed for clarity, as well as certain of the wheels.
Figure 4:
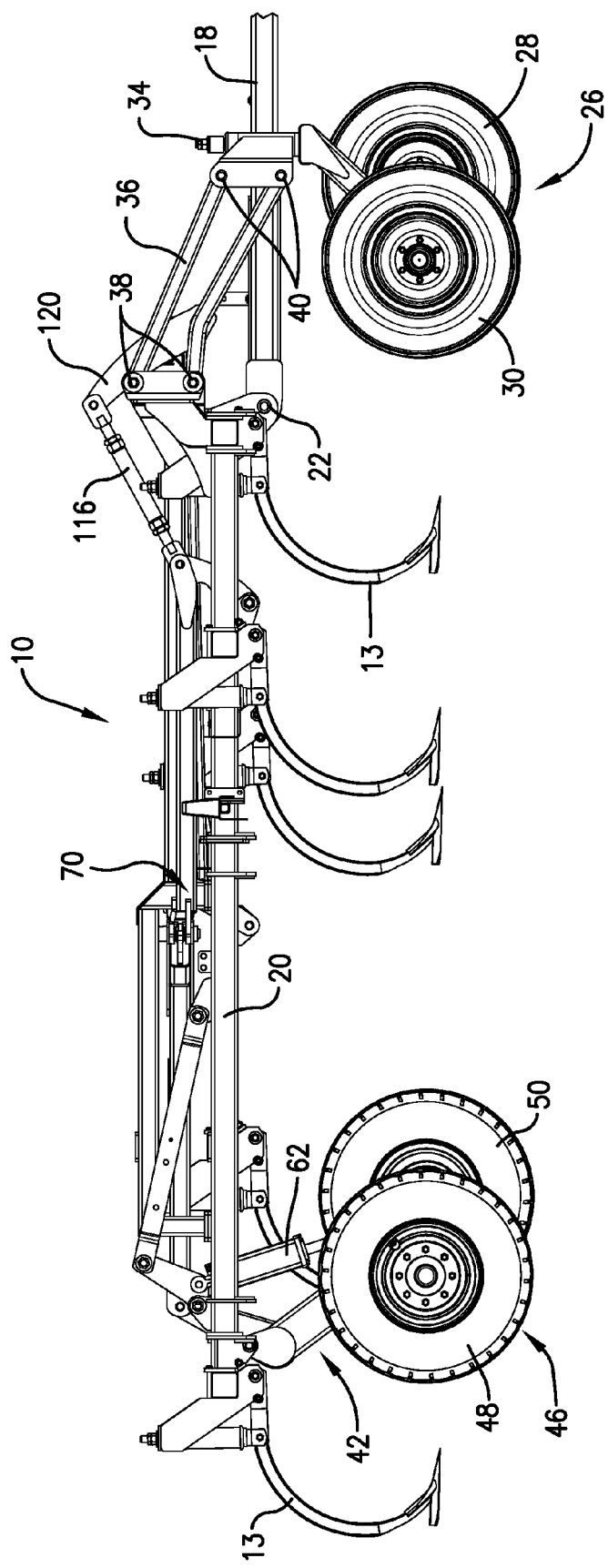
FIG. 4 is a right side elevational view of the center section with the frame in its fully raised, transport position.
Figure 5:
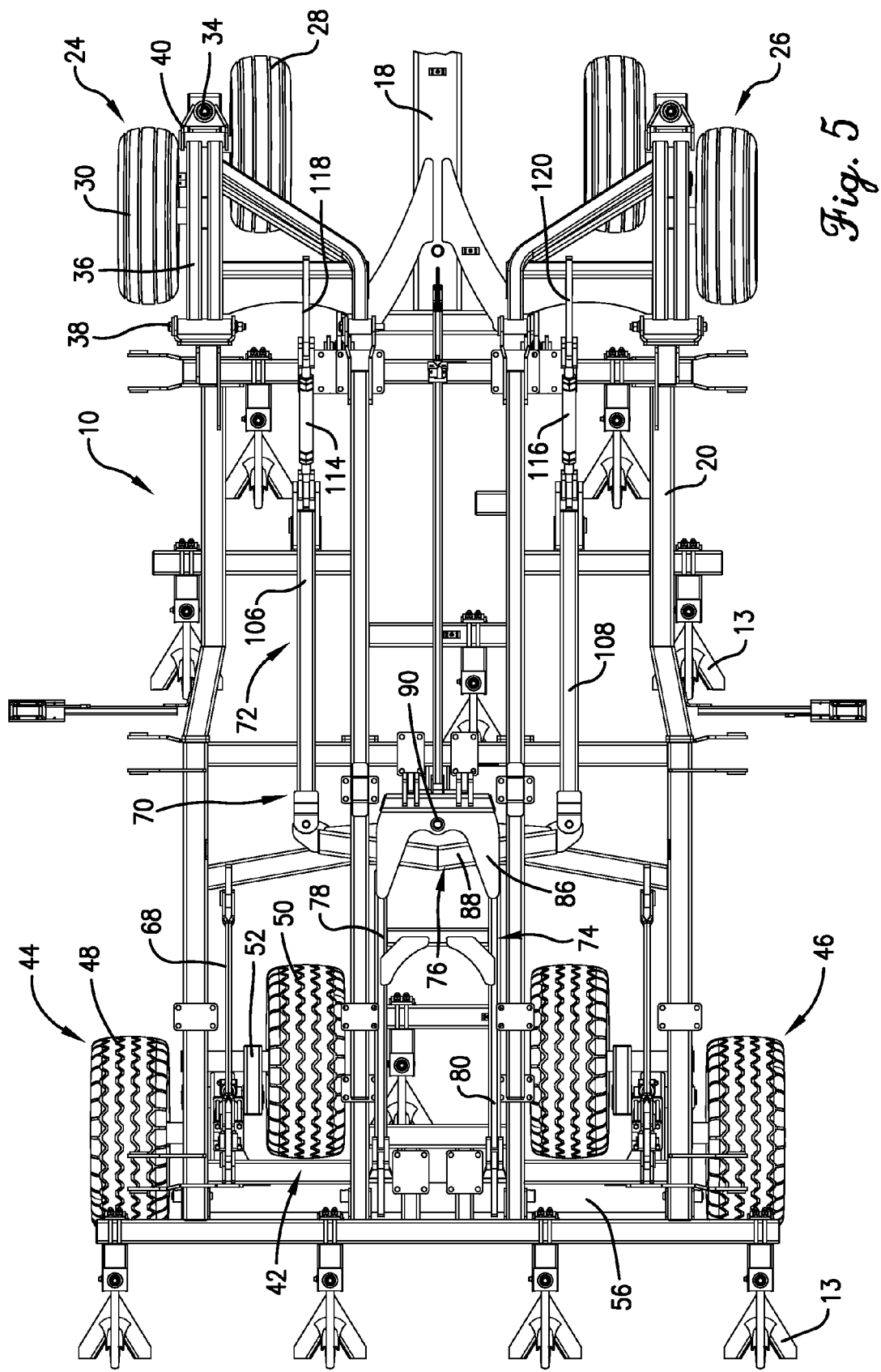
FIG. 5 is a top plan view of the center section with the tongue fragmentarily shown.
Figure 6:
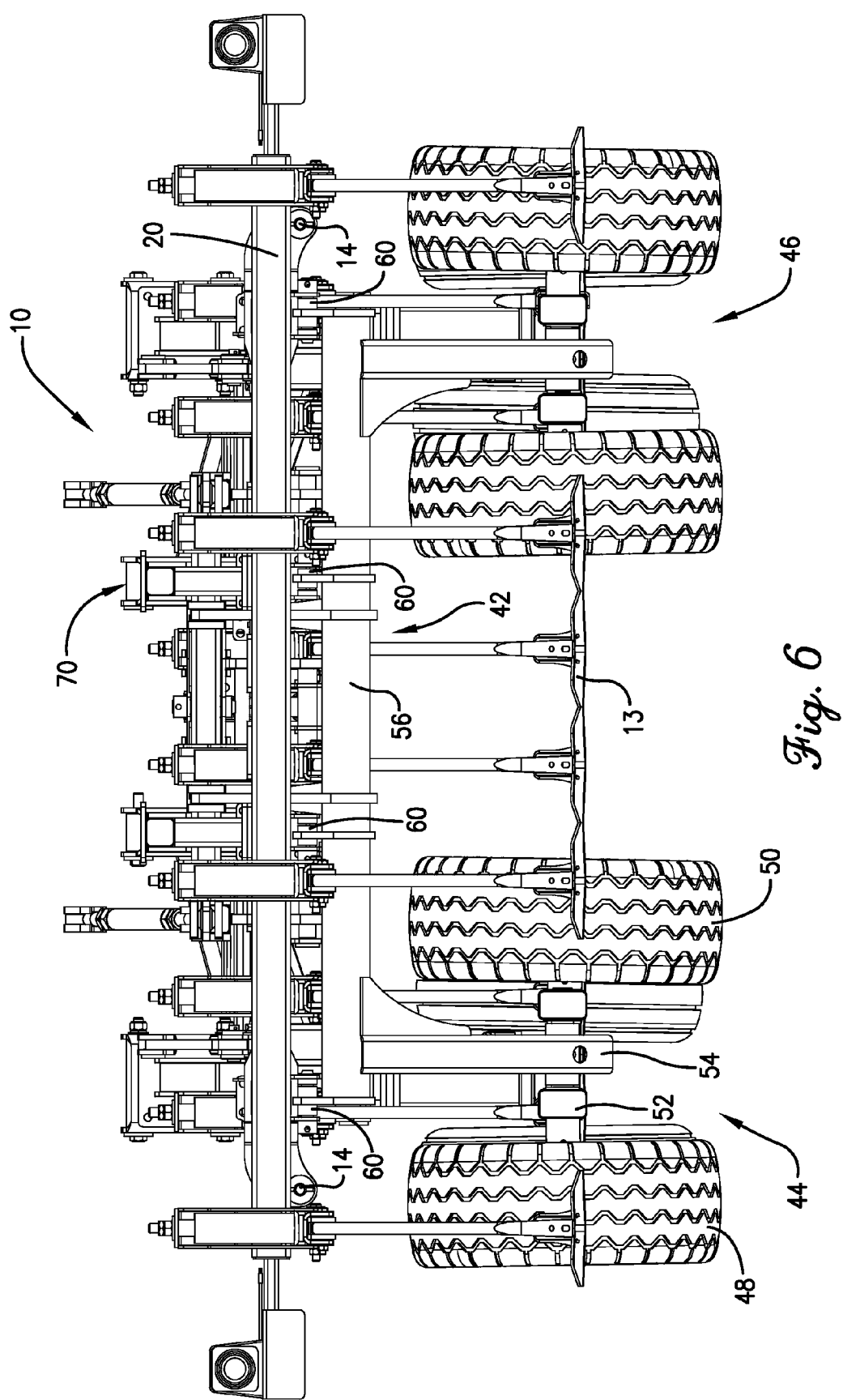
FIG. 6 is a rear elevational view of the center section with the frame in its fully raised, transport position.
Figure 7:
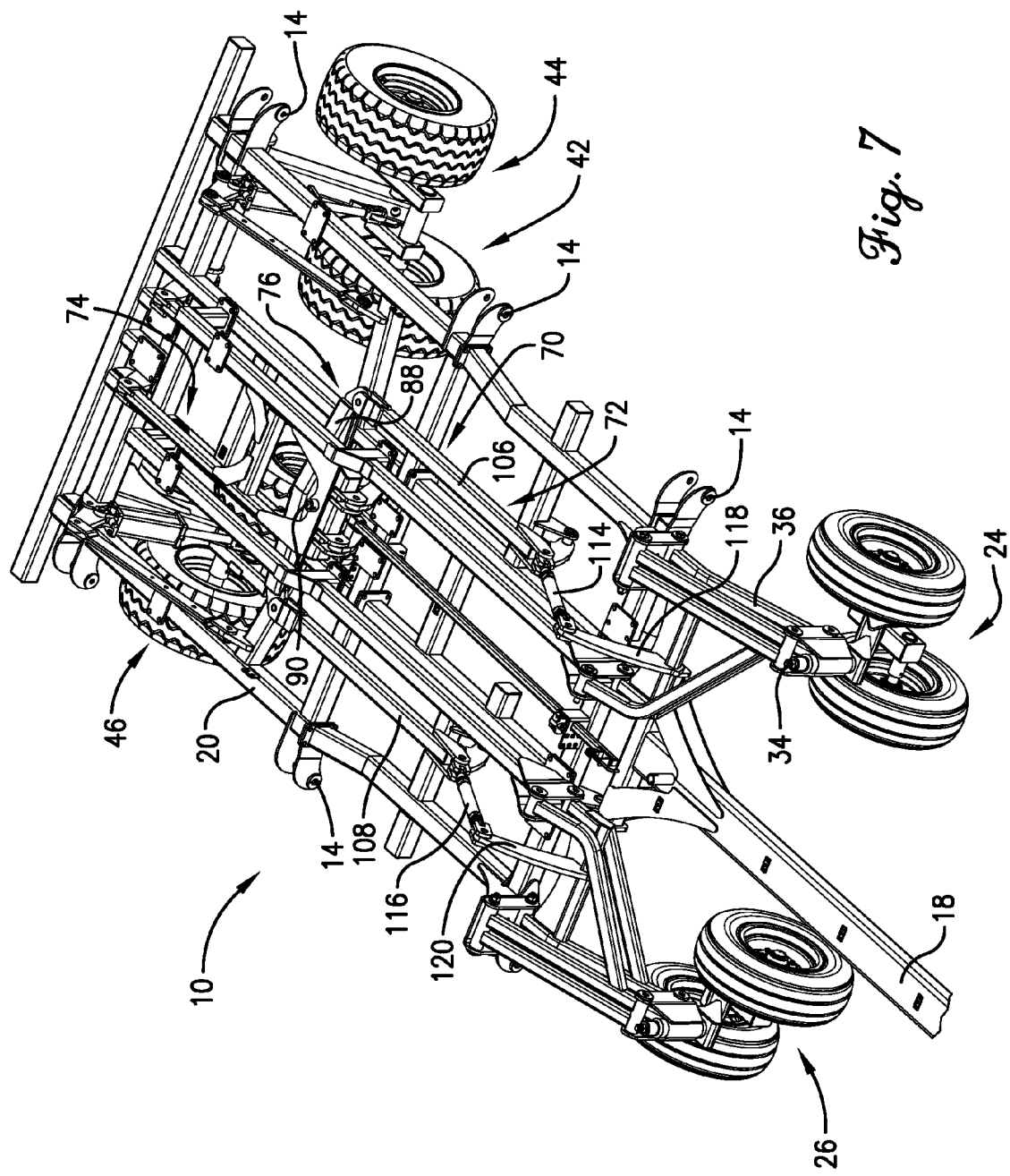
FIG. 7 is a left front isometric view of the center section taken from above the implement.
Figure 8:
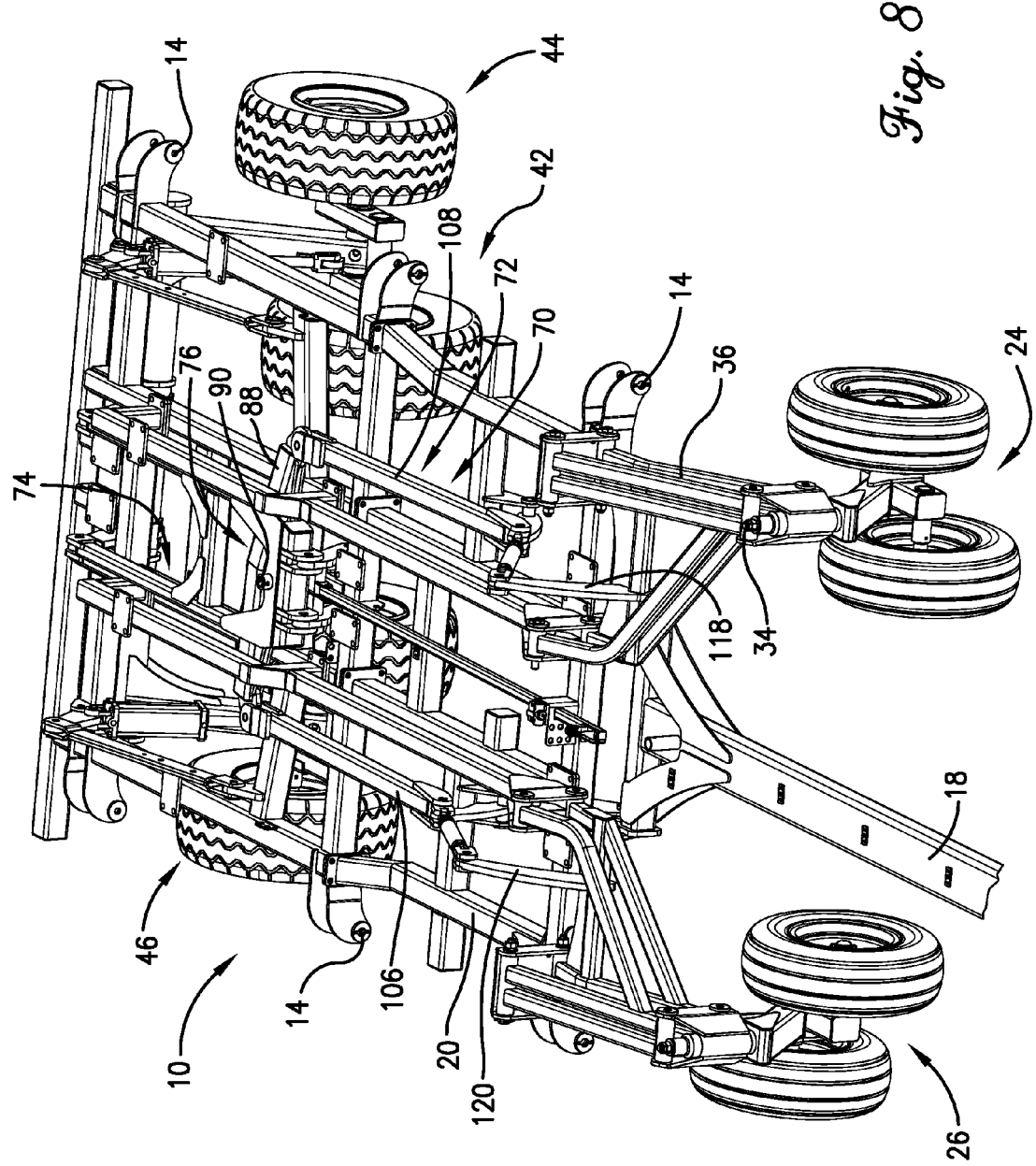
FIG. 8 is a left front isometric view of the center section similar to FIG. 7 but on a larger scale.
Figure 9:
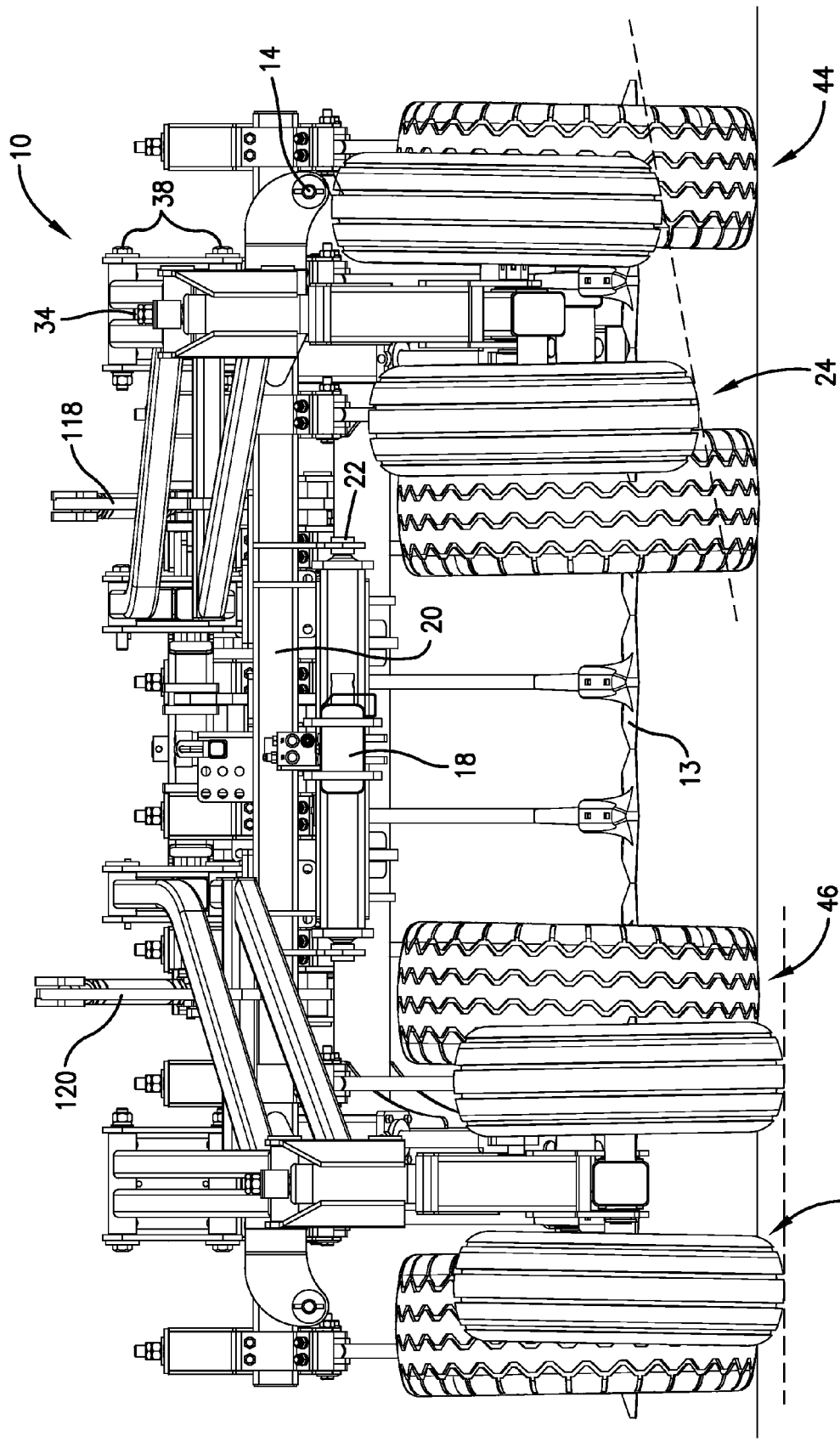
FIG. 9 is an enlarged front elevational view of the center section illustrating the manner in which the front wheels are adapted for non-corresponding up-and-down shifting relative to one another as the terrain varies between the two wheels.
Figure 10:
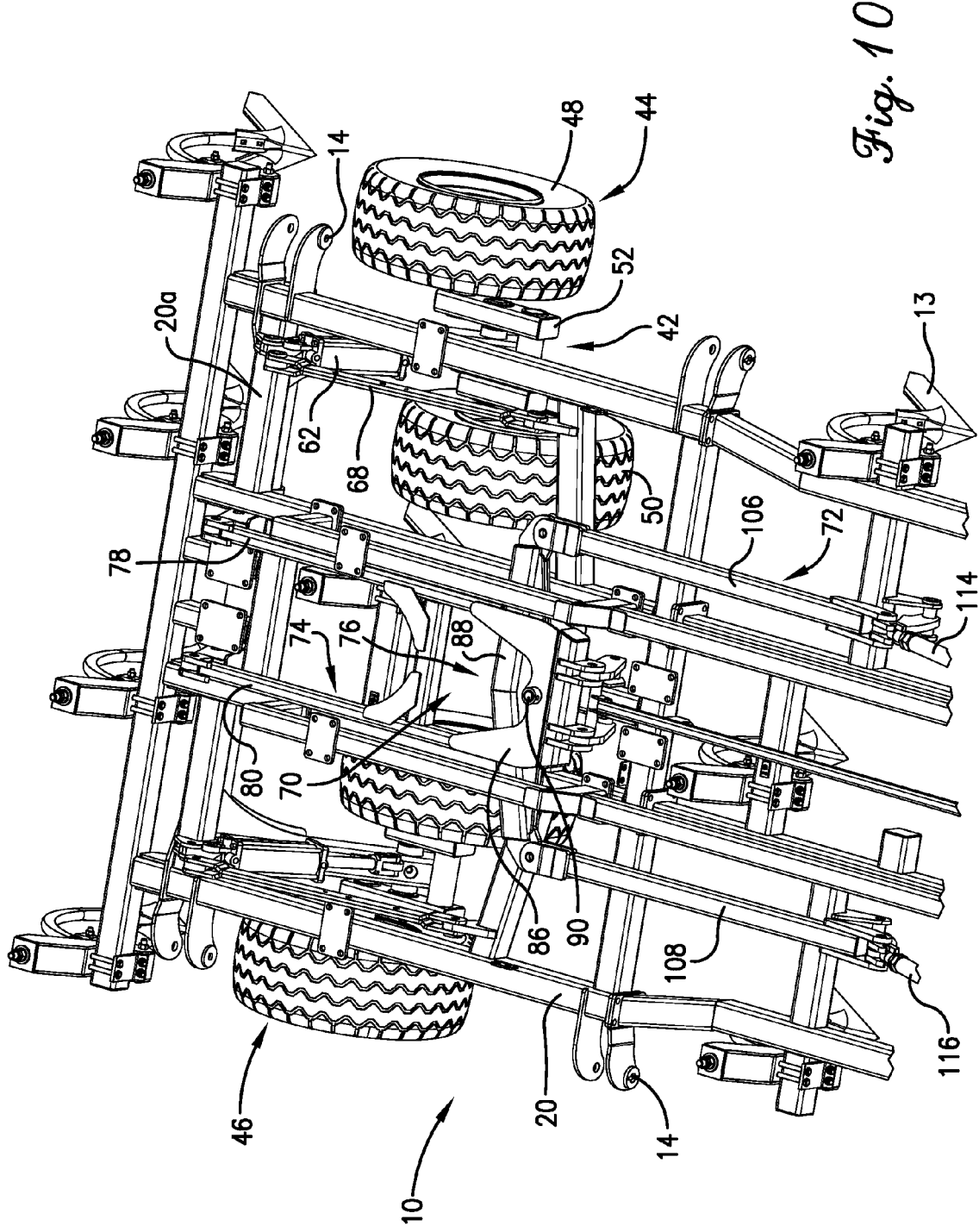
FIG. 10 is a fragmentary top isometric view of the center section corresponding to the condition of things in FIG. 9 and illustrating the way in which the rocker bar pivots to maintain both front wheels engaging the ground and supporting the implement frame.
Figure 11:
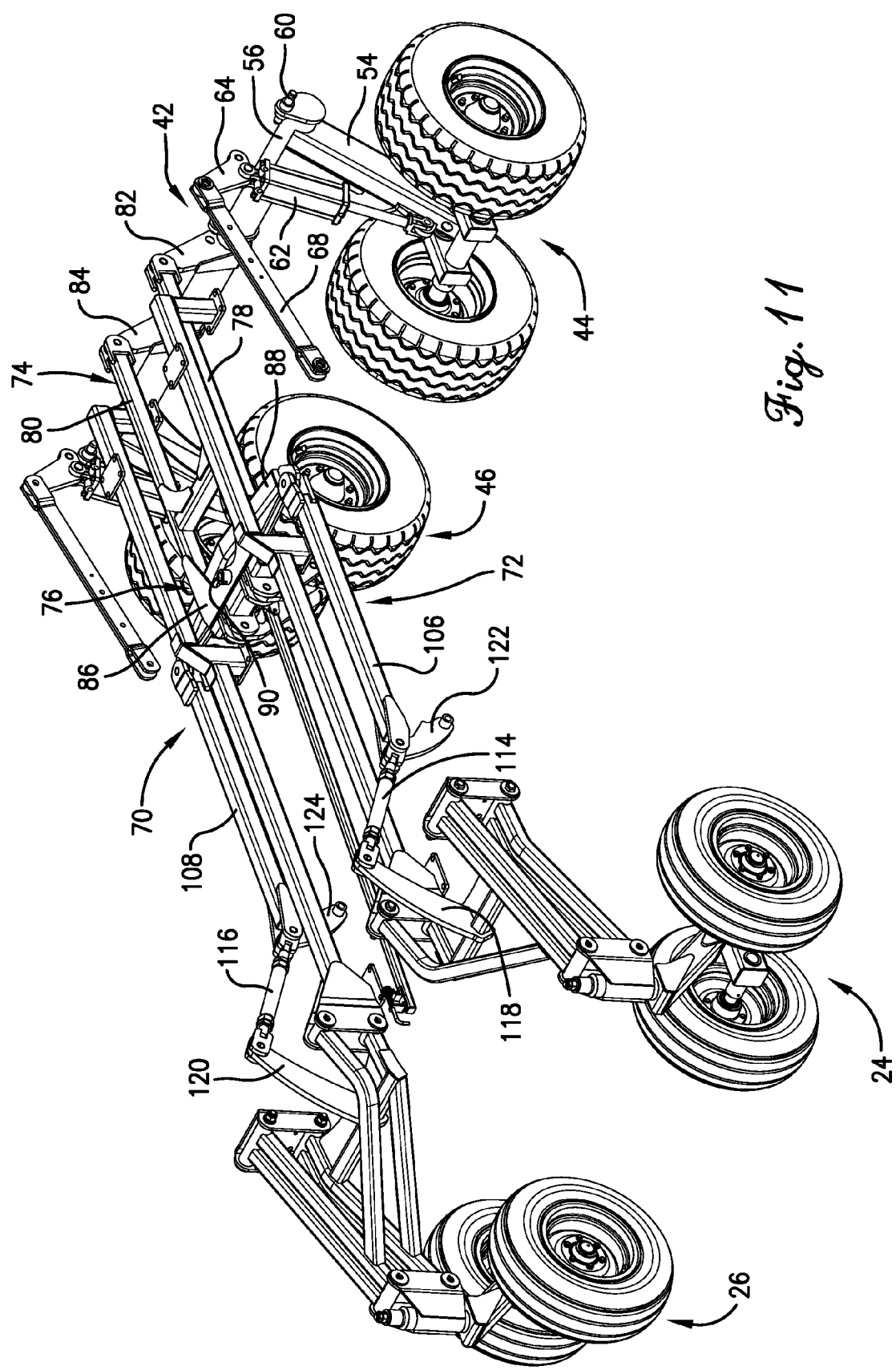
FIG. 11 is a left front isometric view of the center section with portions of the frame and other components removed to illustrate details of the linkage system between the rear lift wheels and front gauge wheels of the machine.
Figure 12:
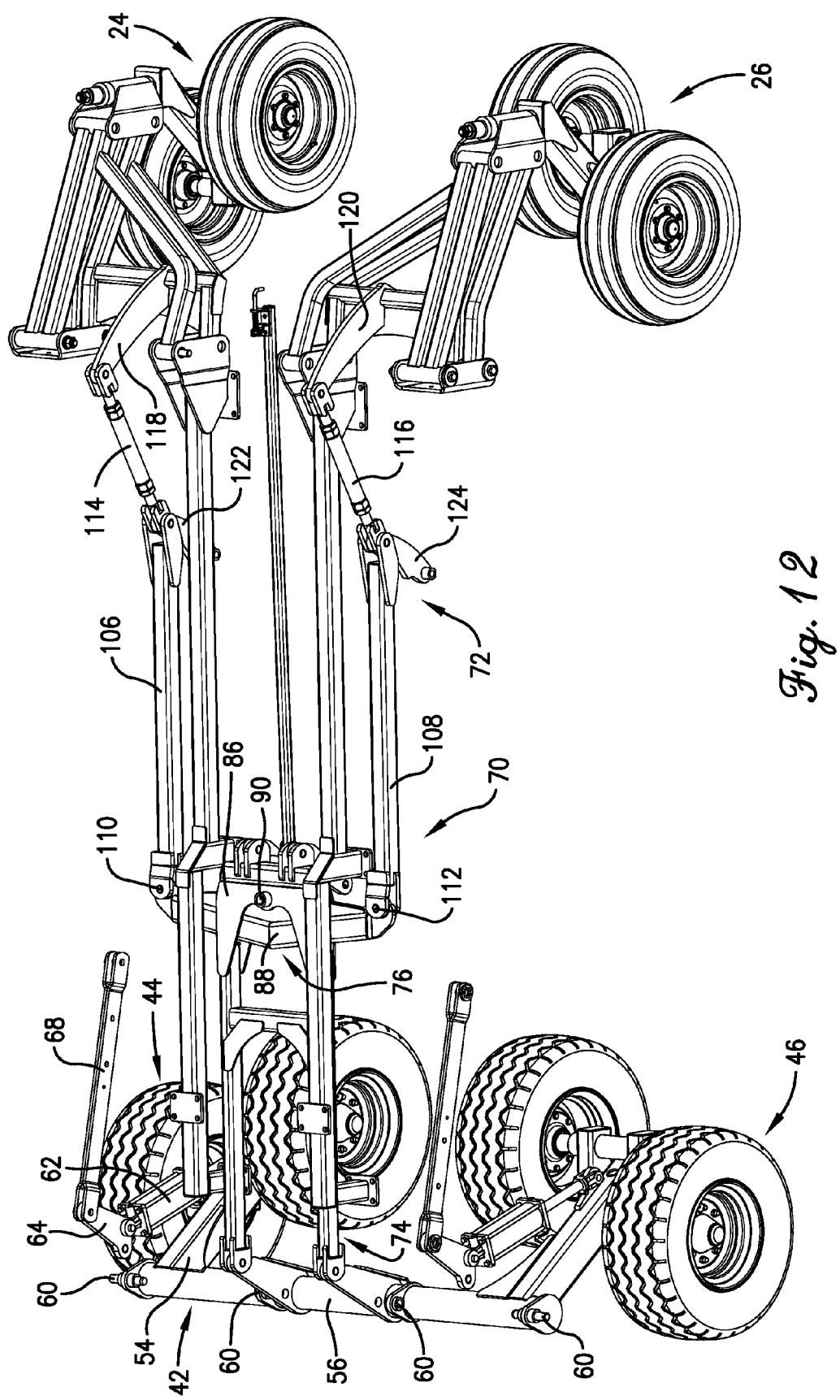
FIG. 12 is a right top isometric view of the center section with parts removed as in FIG. 11.
Figure 13:
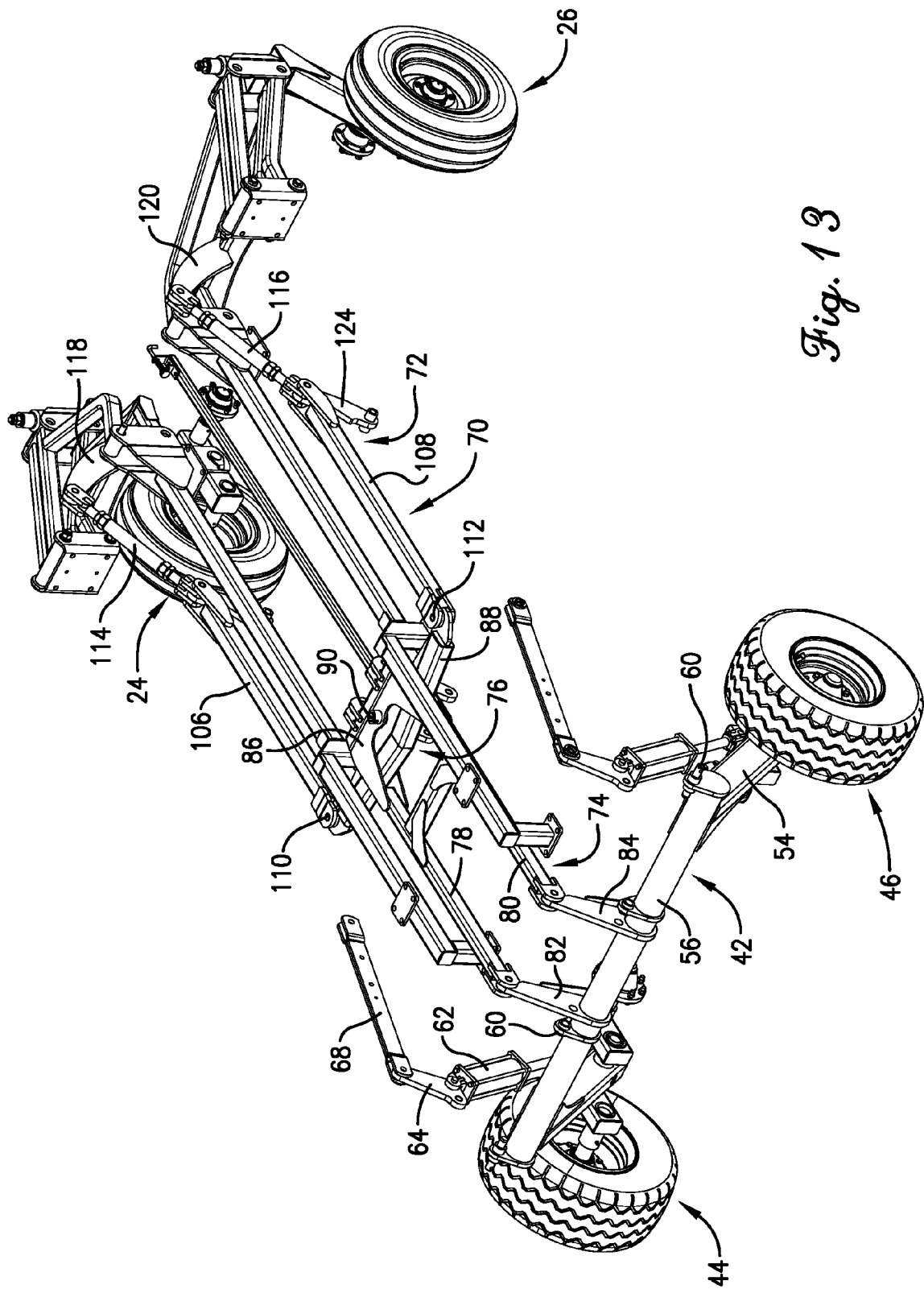
FIG. 13 is a right rear isometric view of the center section with parts removed as in FIGS. 11 and 12.
Figure 14:
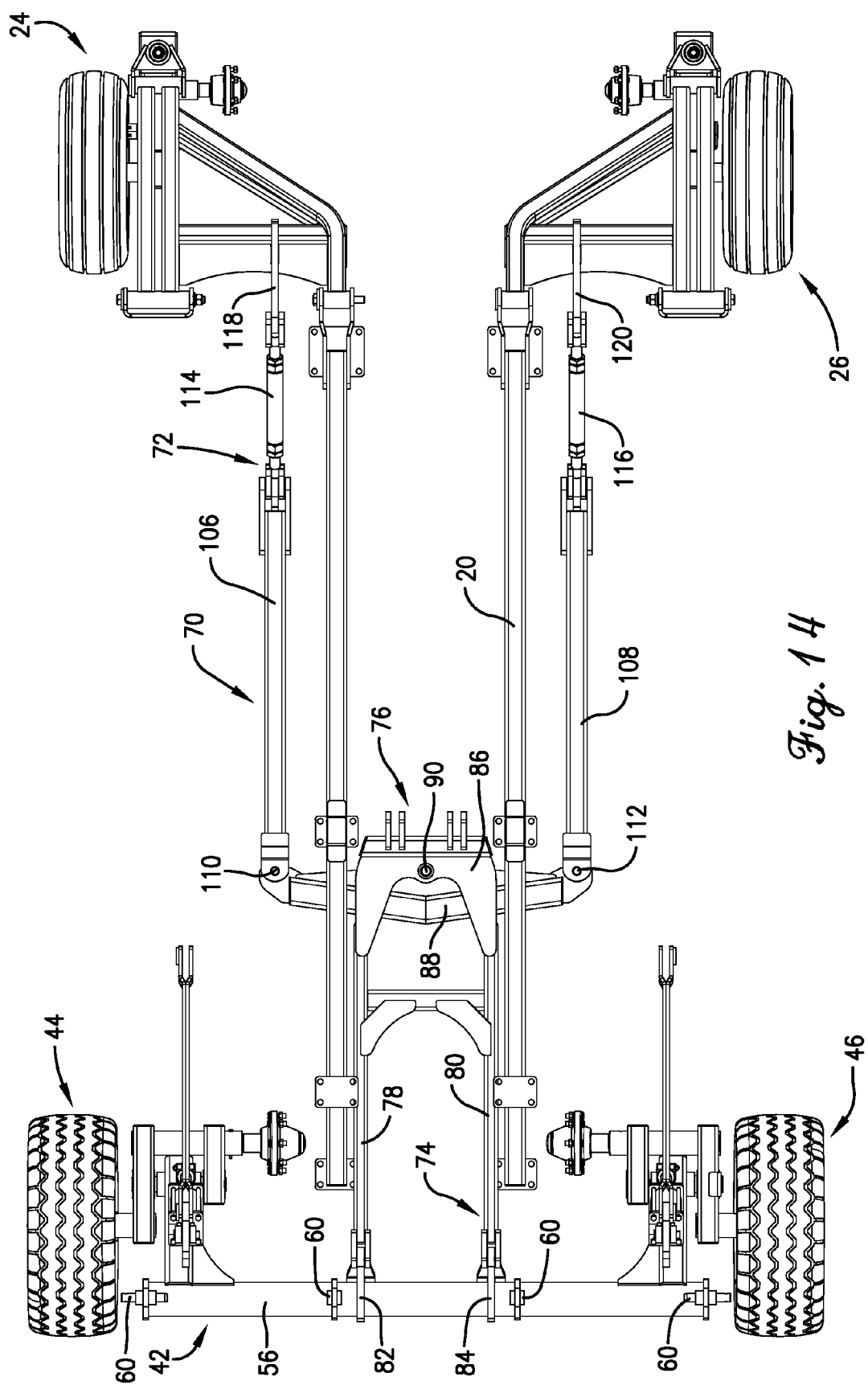
FIG. 14 is a top plan view of the center section with parts removed as in FIGS. 11, 12 and 13, the linkage system being shifted fully forward corresponding to a fully raised condition of the machine.
Figure 15:
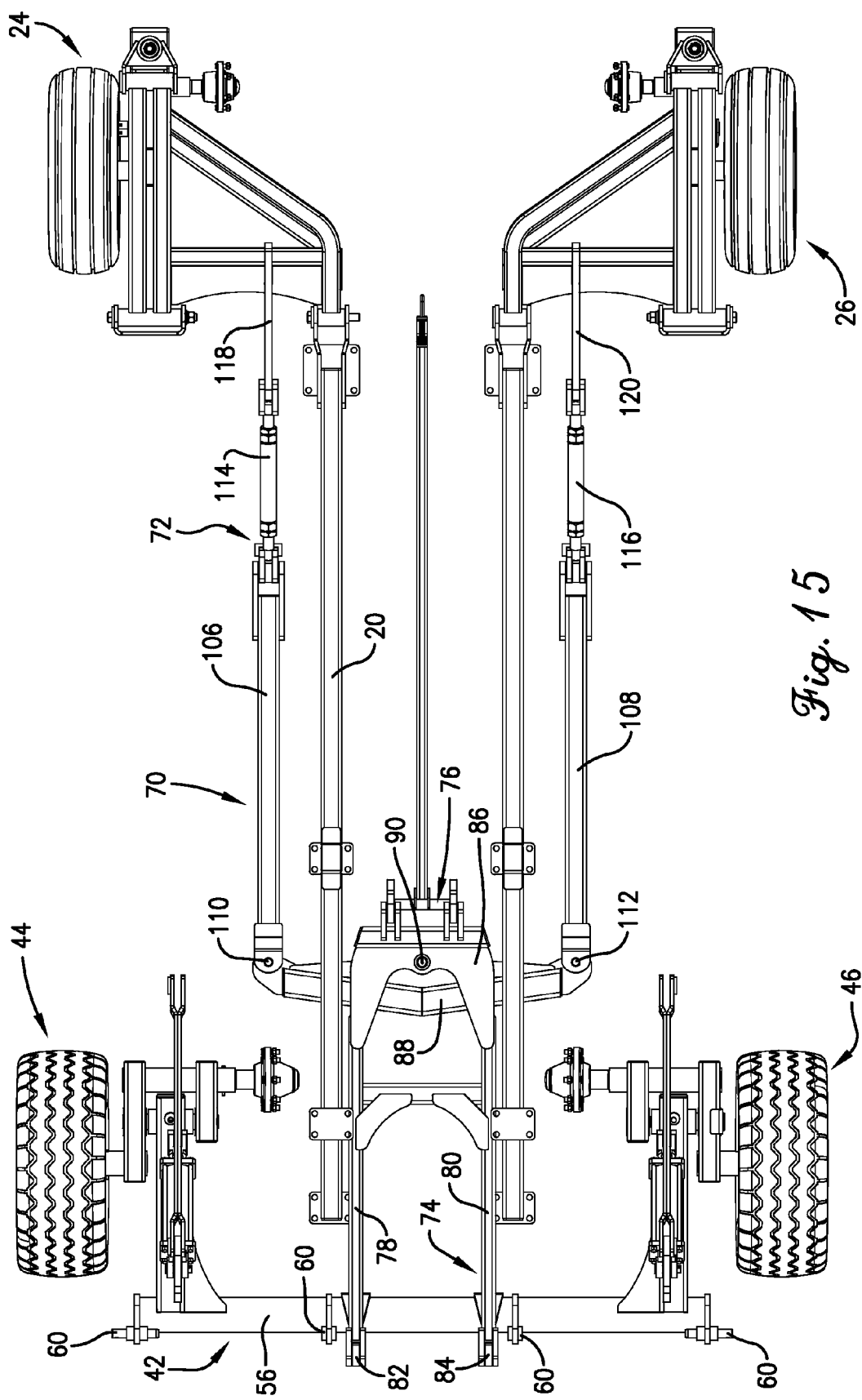
FIG. 15 is a top plan view of the center section similar to FIG. 14 but with the linkage system shifted fully rearward corresponding to a fully lowered condition of the machine.
Figure 16:
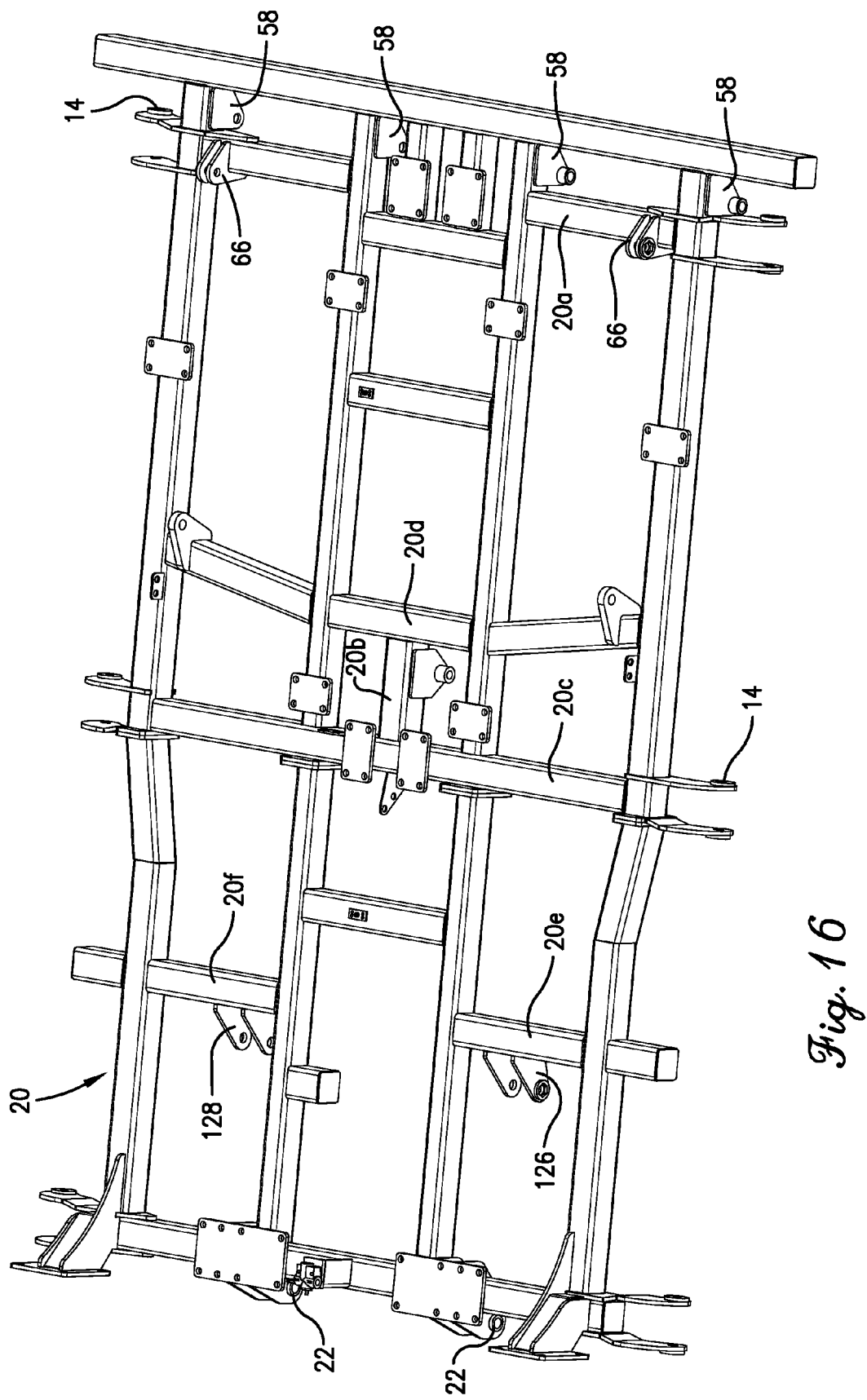
FIG. 16 is a top left isometric view of the frame of the center section.
Figure 17:
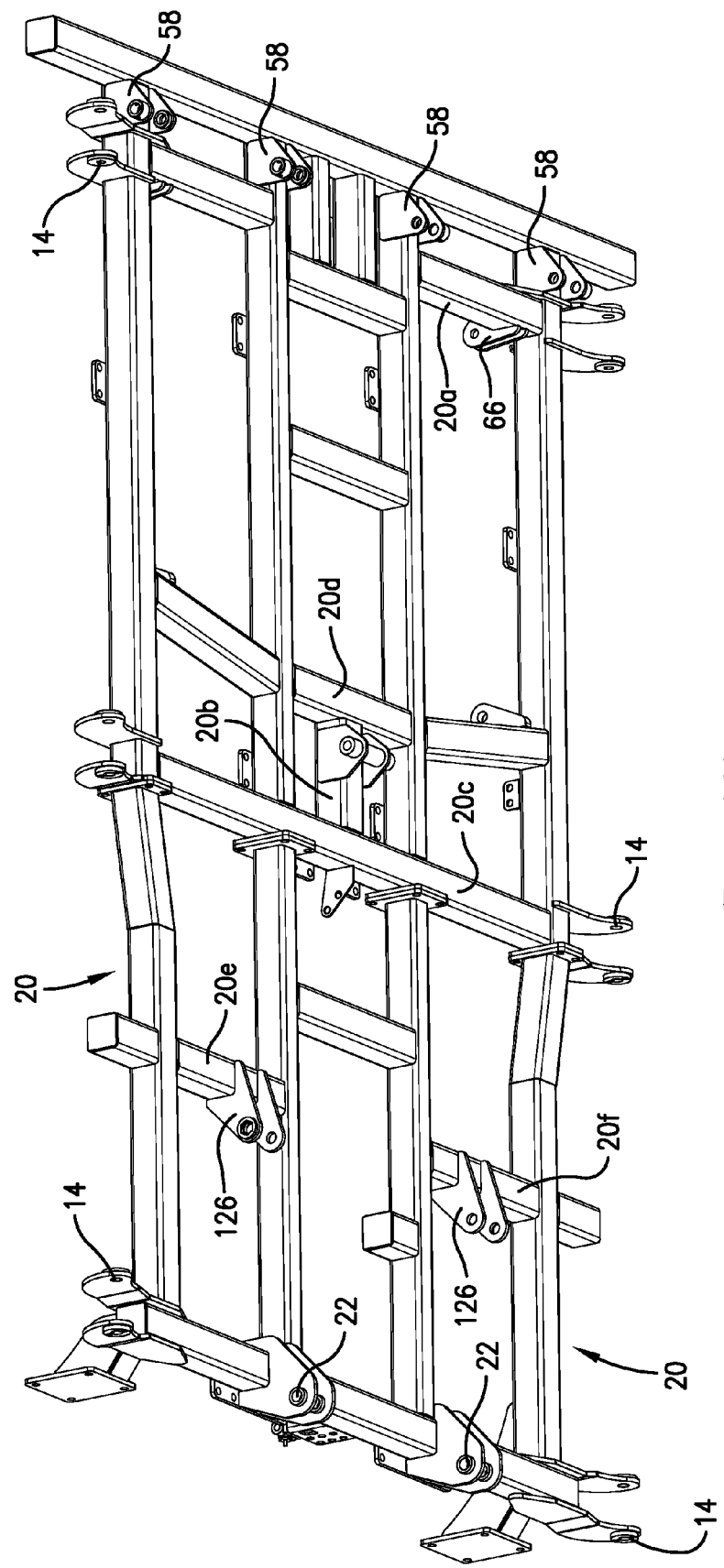
FIG. 17 is a bottom left isometric view of the frame of the center section.
Figure 18:
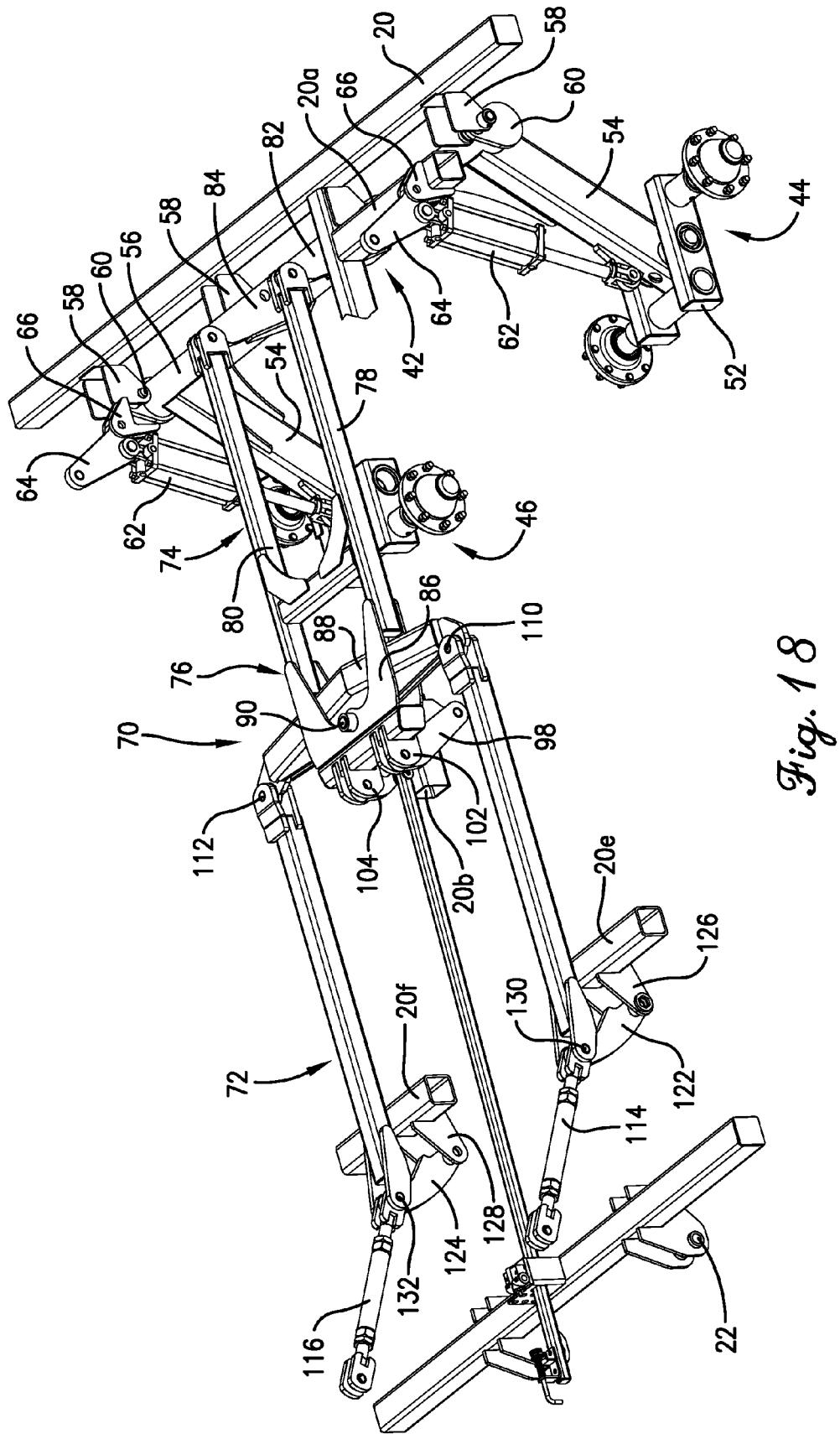
FIG. 18 is a left front isometric view of the linkage system with most of the frame and associated components removed to reveal details of construction of the linkage system.
Figure 19:
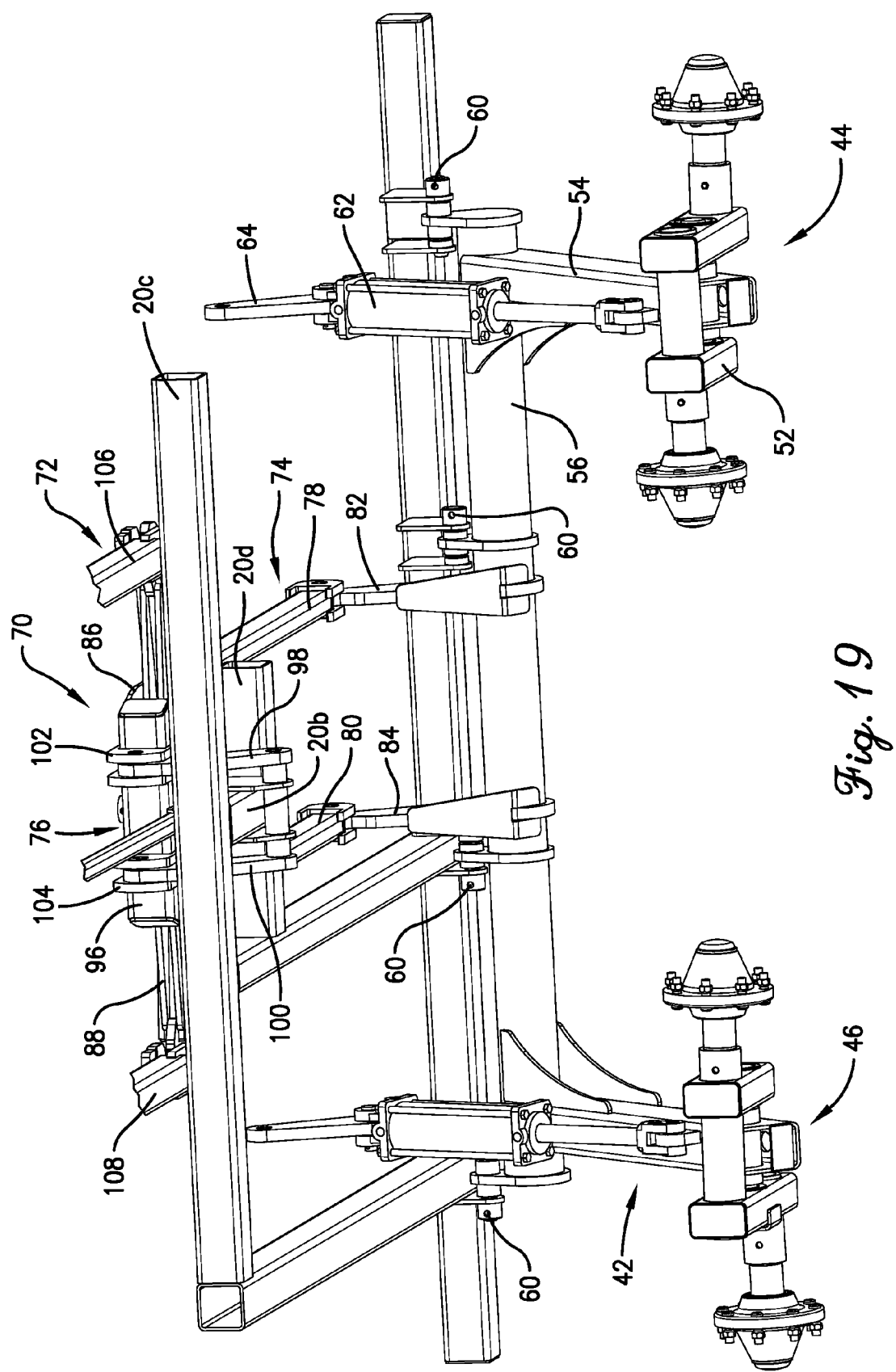
FIG. 19 is a left bottom isometric view of the linkage system with most of the frame and associated components removed as in FIG. 18.
Figure 20:
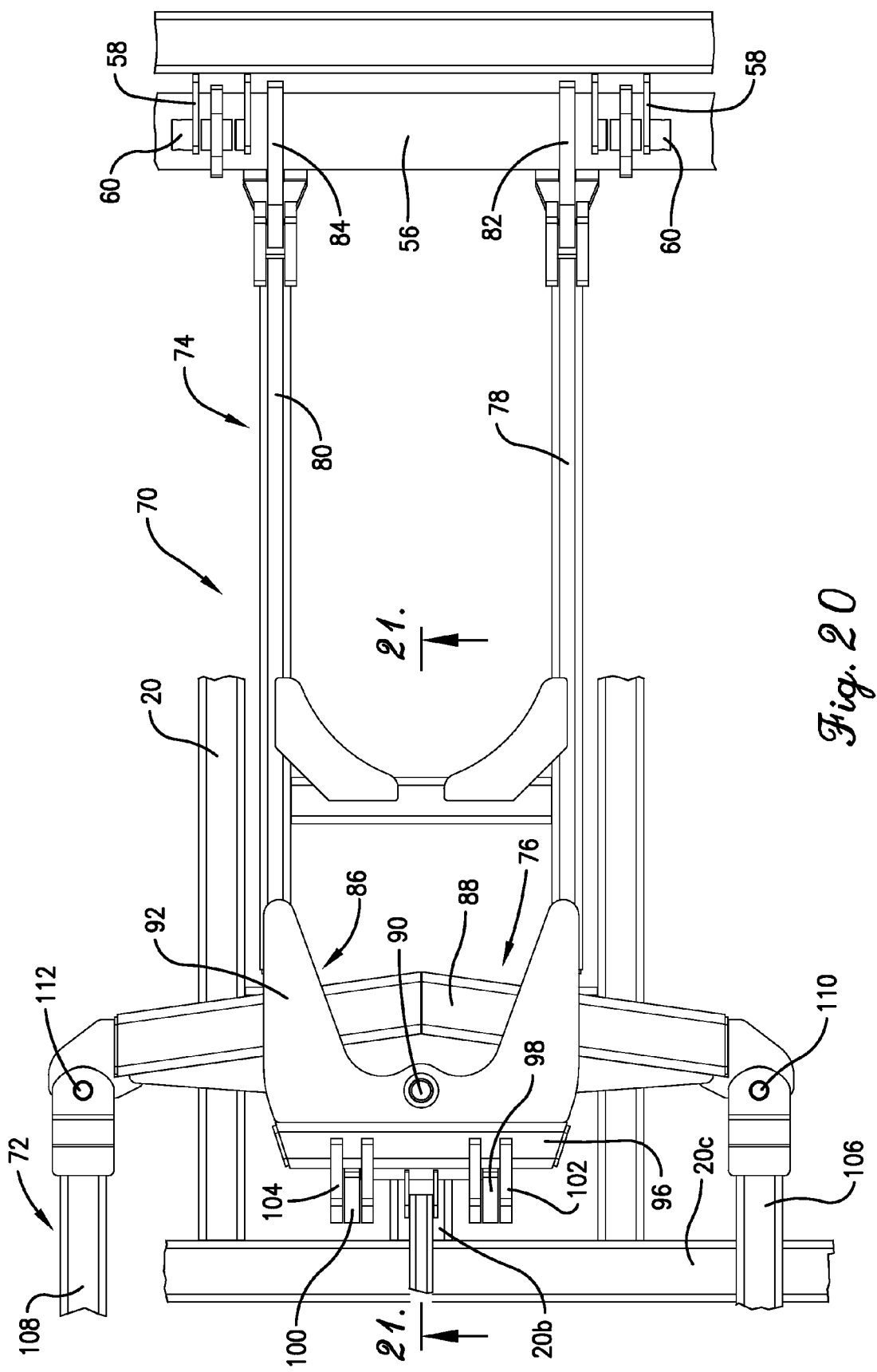
FIG. 20 is an enlarged, fragmentary top plan view of the linkage system with most of the frame and associated components removed as in FIGS. 18 and 19.
Figure 21:
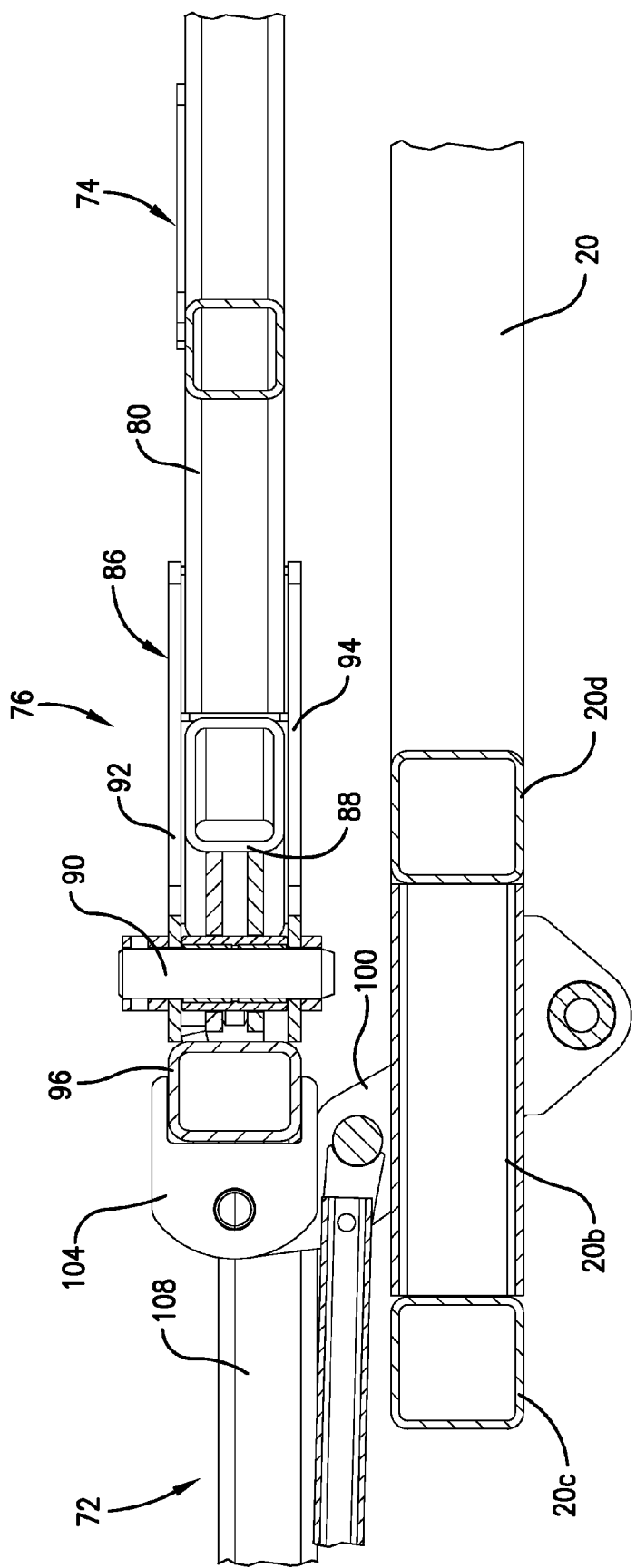
FIG. 21 is a fragmentary, fore-and-aft, vertical cross-sectional view through the linkage system taken substantially along line 21-21 of FIG. 20.
Figure 22:
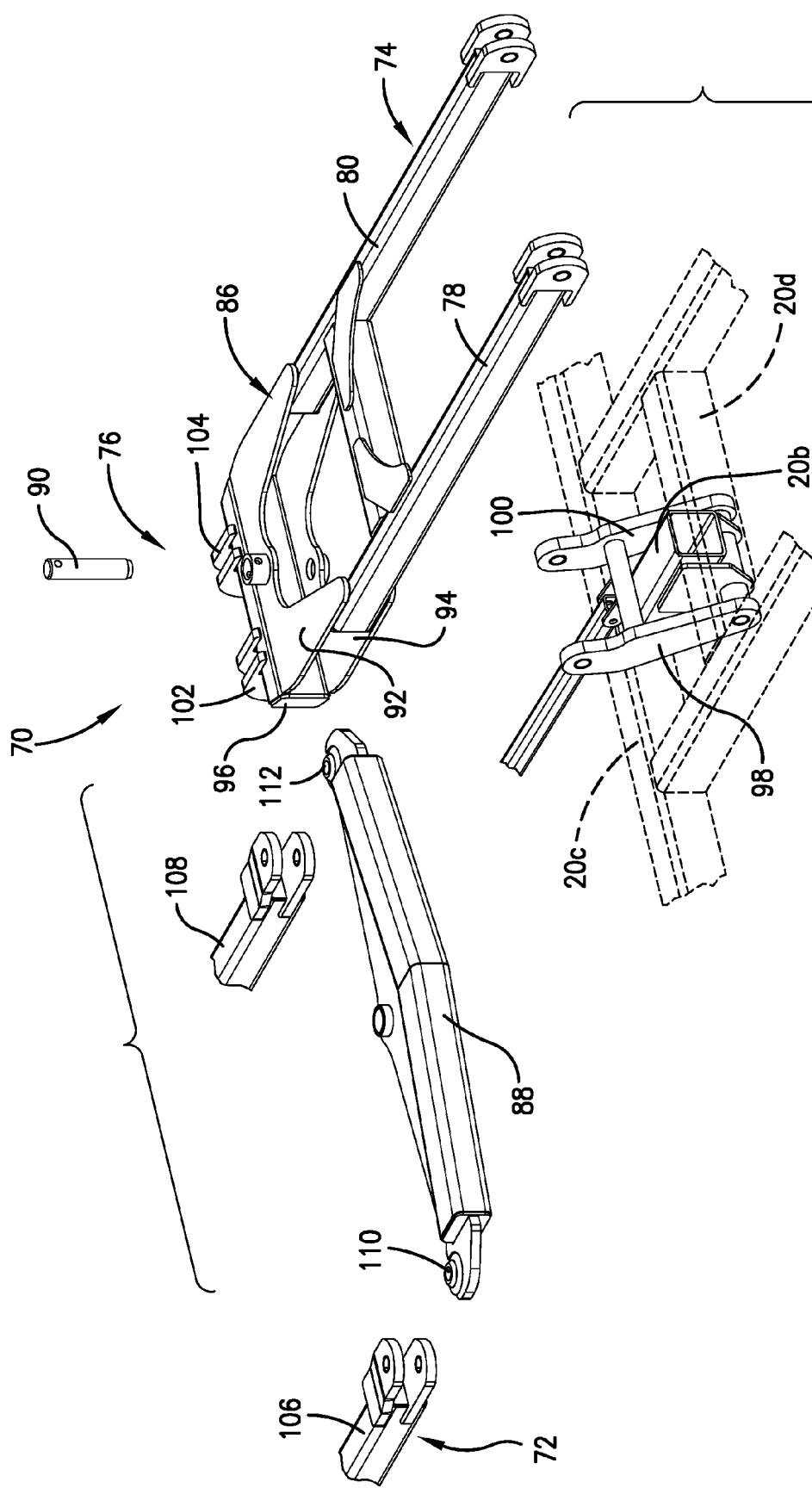
FIG. 22 is an exploded, fragmentary, rear isometric view of the rocker coupling between the front and rear linkages of the linkage system.
Figure 23:
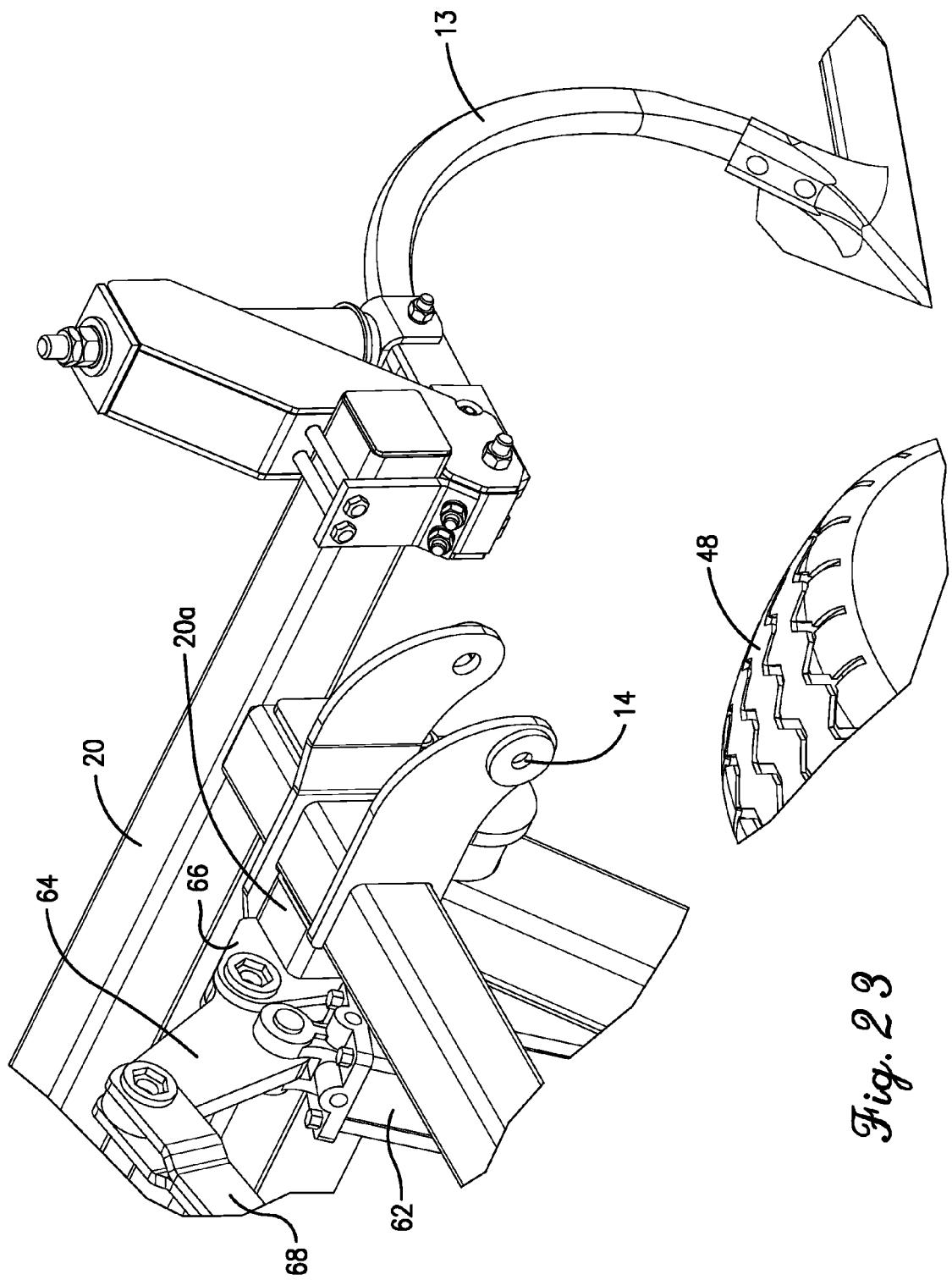
FIG. 23 is an enlarged, left front isometric view of the left rear corner of the center section illustrating an exemplary one of the multiple tillage tools (shanks with sweeps) carried by the machine.
Figure 24:
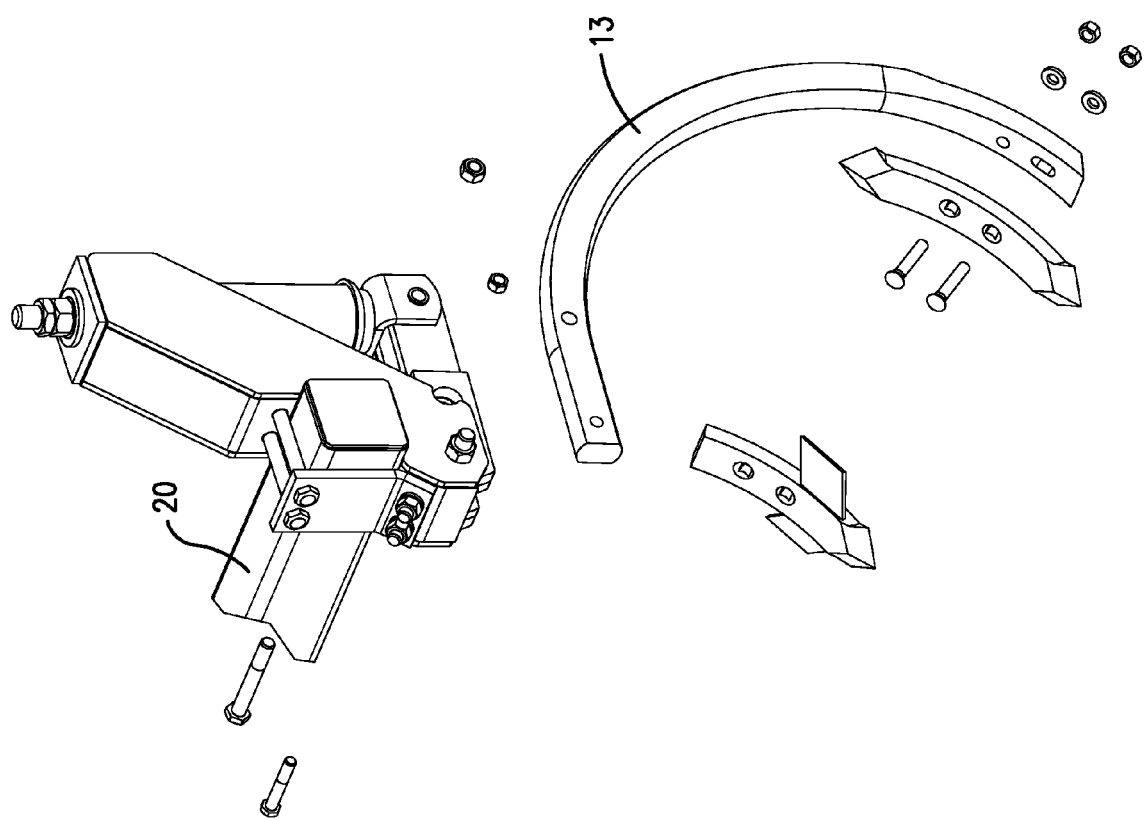
FIG. 24 is an exploded front isometric view of another form of tillage tool (shanks with replaceable straight or winged chisel points) that could be carried by the machine.

FIGS. 1 and 2 show a tillage implement, more specifically a multi-section field cultivator, that is constructed in accordance with the principles of the present invention. In the illustrated embodiment, the implement has a center section 10, a right wing section 12, and a left wing section (not shown). When applied to various parts of the machine, the terms "left" and "right" are utilized as if the machine were being viewed from the rear, looking forwardly. In the remaining FIGS. 3-26, only the center section 12 is illustrated. A number of ground-working tillage shanks 13 are carried by the implement sections at spaced locations and may take a variety of forms as illustrated, for example, in FIGS. 1-23 on the one hand and FIG. 24 on the other hand. The shanks in FIGS. 1-23 include sweeps at their lower end, while the shank in FIG. 24 illustrates the use of interchangeable winged or straight points at its lower end.

Each wing section is connected to center section 10 by hinges 14 in the usual manner so that the implement can "flex" about hinges 14 during field operations and the wing sections can be folded up into upright positions for transport. As illustrated with respect to wing section 12, hydraulic cylinders 16 are connected between center section 10 and the wing sections for raising and lowering the same between their transport and field positions.

A floating front hitch or tongue 18 is attached to the front of a main frame 20 (see also FIGS. 16 and 17) of center section 10 by a transverse pivot 22 (FIG. 4) so that vertical forces are not transferred between the implement and a tractor (not shown) that pulls the implement using hitch 18.

Center section 10 is equipped with front and rear wheels. The front wheels include a pair of front gauge wheels 24 and 26 on opposite left and right sides of an imaginary, fore-and-aft centerline through center section 10 and hitch 18 extending in the direction of travel of the machine. Each of the front gauge wheels 24, 26 may comprise a single wheel or multiple wheels, but in the embodiment selected for illustration includes a pair of side-by-side, but slightly fore-and-aft offset, wheels 28 and 30 mounted on a walking beam 32 in the usual manner. In a preferred form, each front gauge wheel 24, 26 comprises a castor wheel assembly so that it can pivot freely about a vertical pivot 34 in reaction to ground forces during turns of the machine as it is towed through a field.

Each front gauge wheel 24, 26 is connected to main frame 20 for vertical shifting movement relative to main frame 20. In a preferred form, such vertical movement is accomplished using a four-bar, parallel linkage 36 having a rear end pivotally connected to main frame 20 at a pair of fixed pivot points 38 and a front end pivotally connected to a support for wheels 28, 30 at a pair of vertically shiftable pivot points 40. When front wheels 24, 26 are shifted vertically in unison relative to main frame 20 and are engaging the ground, the front of frame 20 is raised and lowered.

The rear wheels may comprise a rear wheel assembly broadly denoted by the numeral 42. Rear wheel assembly may include a number of single or multiple wheels, but in the embodiment selected for illustration includes at least a pair of left and right lift wheels 44 and 46 on opposite lateral sides of the imaginary centerline of the machine. Each lift wheel 44, 46 preferably includes a pair of side-by-side but slightly fore-and-aft offset ground wheels 48 and 50 attached to a walking beam 52. Each walking beam 52 is pivotally joined to the lower end of an inclined wheel arm 54.

Rear wheel assembly 42 further includes a transverse torque bar 56 extending across the rear of main frame 20. Torque bar 56 is eccentrically and pivotally mounted on main frame 20 by depending lugs 58 on frame 20 (FIGS. 16, 17) and eccentric pivots 60 on torque bar 56 (FIGS. 6, 11, 12 and 18-20). Wheel arms 54 are fixed at their upper ends to torque bar 56 such that as torque bar 56 is pivoted on frame 20 about the eccentrically disposed axis defined by pivots 60, rear wheel assembly 42 is raised and lowered relative to frame 20, thus raising and lowering the rear of frame 20 when wheels 44, 46 of rear wheel assembly 42 are engaging the ground. Torque bar 56 and wheels arms 54 thus form a rear wheel support system for rear wheels 44, 46.

Powered mechanism for raising and lowering rear wheel assembly 42 may include a hydraulic cylinder 62 for each rear wheel 44, 46 that is operably connected between the rear wheel and the frame. Each cylinder 62 is connected at its lower rod end to the lower end of wheel arm 54 and at its upper base end to a lug 64 that is pivoted to an upwardly projecting, bifurcated ear 66 on a cross member 20a of frame 20 (FIGS. 16-18, 23). An inclined strut 68 is connected at its opposite ends to main frame 20 and the outer end of lug 64. Lug 64 and strut 68 cooperate to form a fixed, non-pivoting anchor structure on frame 20 for the base end of cylinder 62.

A special linkage system 70 operably connects rear wheel assembly 42 with front wheels 24, 26 in such a manner that powered operation of rear wheel assembly 42 by lift cylinders 62 causes corresponding operation of front wheels 24, 26 in unison, yet front wheels 24, 26 are free to shift independently of rear wheel assembly 42 and relative to each other in a non-corresponding manner to accommodate terrain differences between the two front wheels. As used herein, "non-corresponding" shifting of the left and right front wheels 24, 26 relative to frame 20 and each other means that movement of one of the front wheels is not always accompanied by identical movement (in direction and speed) of the other front wheel. One example of non-corresponding movement of two wheels is when one wheel goes up by a certain distance and the other is required to go down by that same distance (e.g., a solid front axle extending between the wheels with a single pivot point in the middle). Another example of non-corresponding movement of two wheels is when the two wheels can move up and down completely independently of one another (e.g., independent front wheel suspension). In a preferred embodiment of the present invention, non-corresponding shifting of the two front wheels 24, 26 includes shifting in equal amounts and in opposite directions in an effort to maintain both front wheels on the ground at all times so that the load of the front of the frame 20 is always equally shared by both wheels.

Linkage system 70 broadly includes a front linkage 72 extending rearwardly from front wheels 24, 26, a rear linkage 74 extending forwardly from rear wheel assembly 42, and a coupling 76 that interconnects front and rear linkages 72, 74. Rear linkage 74 includes a pair of laterally spaced apart, fore-and-aft extending transfer members or links 78 and 80 on opposite sides of the imaginary centerline of the machine, such links 78, 80 being pivotally connected at their rear ends to crank arm structure in the nature of a pair of corresponding, upwardly projecting extension or crank arms 82 and 84 fixed to torque bar 56.

Coupling 76 (detailed in FIGS. 20, 21 and 22) includes a generally U-shaped (in plan) support frame 86 fixed to the front end of rear linkage 74 and a transverse, equalizing rocker bar 88 pivotally carried by support frame 86 for rocking movement about an upright axis through a pin 90. As illustrated particularly in FIG. 21, rocker support frame 86 of coupling 76 includes a pair of vertically spaced, upper and lower, generally U-shaped plates 92 and 94 that receive rocker bar 88 therebetween, the plates 92, 94 being fixed at their rear, pointed ends to the front ends of rear links 78, 80. A relatively short, rigid cross piece 96 is fixed to plates 92, 94 at their front ends.

Coupling 76 is supported above frame 20 for fore-and-aft movement with front and rear linkages 72, 74 by a pair of generally upright, rigidly interconnected arms 98 and 100 that are pivotally connected to forwardly projecting lugs 102 and 104 on cross piece 96 of rocker support frame 86. Arms 98, 100 are pivotally connected at their lower ends to opposite sides of a fore-and-aft stub beam 20b that is rigidly fixed at its opposite ends to cross members 20c and 20d of frame 20.

Front linkage 72 includes a pair of laterally spaced apart, fore-and-aft extending, front actuator arms or links 106 and 108 on opposite sides of the centerline of the machine. Front links 106, 108 are pivotally connected at their rear ends by corresponding upright pivots 110 and 112 to opposite ends of rocker bar 88 on opposite, left and right sides of rocker pivot 90. Front links 106, 108 are operably coupled at their front ends with respective ones of the front wheels 24, 26 by corresponding left and right transfer members or turnbuckles 114 and 116 and by corresponding left and right connection or crank arms 118 and 120 on front wheels 24, 26. Turnbuckles 114, 116 are pivotally connected at their rear ends to corresponding ones of the front links 106, 108 and are pivotally connected at their front ends to the outer ends of corresponding ones of the crank arms 118, 120. Crank arms 118, 120 are rigidly affixed at their lower ends to the lower links of the four-bar linkages 36 of front wheels 24, 26.

The front ends of front links 106, 108 are movably supported above frame 20 by a pair of generally upstanding levers 122 and 124 (FIGS. 11-13, 18). The lower ends of levers 122, 124 are pivotally connected to corresponding cross members 20e and 20f of frame 20 (FIGS. 16, 17 and 18) by corresponding lugs 126 and 128, while the upper ends of levers 122, 124 are pivotally connected to the corresponding front links 106, 108 by corresponding pivots 130 and 132.

Operation

As the implement traverses a field or is transported over the road or between fields, rear wheels 44, 46 and front gauge wheels 24, 26 of center section 10 cooperate to keep main frame 20 level and support it at a selected height above the ground. The free-floating nature of hitch 18 contributes to maintaining frame 20 level at this time inasmuch as the rear end of hitch 18 merely pivots freely about hitch pivot 22 as frame 20 is shifted up and down between various height positions and the front end of hitch is held at a constant height by the towing tractor. As lift cylinders 62 are extended or retracted to raise or lower rear wheels 44, 46 and thereby raise or lower the rear of frame 20, this motion is transmitted to front wheels 24, 26 by linkage system 70 to simultaneously raise or lower the front of frame 20. Coupling 76, including rocker bar 88, rocker support frame 86, and rocker pivot 90, simply shifts bodily fore-and-aft as a unit with the rest of linkage system 70 at this time. Rocker bar 88 of system 70 stays perpendicular to the line of action of rear linkage 74 during such height adjustment as linkage system 70 effectively operates as a rigid link at this time, and front wheels 24, 26 shift in a corresponding manner.

Rocker bar 88 also stays perpendicular to the line of action of rear linkage 74 when frame 20 is being held by front wheels 24, 26 and rear wheels 44, 46 at a selected height above the ground. However, if one of the front wheels 24, 26 encounters a change in terrain not encountered by the other front wheel 24, 26 (as illustrated, for example in FIG. 9), the front wheels 24, 26 shift vertically relative to frame 20 in a non-corresponding manner in equal and opposite directions to maintain both front wheels in engagement with the ground, thereby keeping the load of the front of frame 20 equally shared by both front wheels. Such action is permitted because the rocker bar 88 is allowed to pivot about its upright pivot 90 within support frame 86 in the appropriate direction and to the appropriate extent at this time, even though upright pivot 90 and rear linkage 74 do not shift fore-and-aft at all. Thus, rear wheels 44, 46 are not affected by the terrain-compensating shifting of front wheels 24, 26 relative to frame 20.

Prior floating hitch machines could experience substantial stress and strain at critical locations as significant differences in terrain were encountered between the two front wheels. If one of the front wheels encountered a high spot not seen by the other front wheel, the high spot could tend to lift the entire front of the machine out of the ground, placing all the load on the one wheel.

It will therefore be seen that four-bar linkages 36, front linkage 72, rocker bar 88, pivot 90, and rocker support frame 86 all comprise parts of a support system for front wheels 24, 26 that allows non-corresponding shifting of front wheels 24, 26 relative to main frame 20. Yet, the front wheel support system is such that front wheels 24, 26 are able to be shifted in a corresponding manner with one another and with rear wheels 44, 46 when the support system for rear wheels 44, 46 is actuated.

Alternative Embodiments

Figure 25:
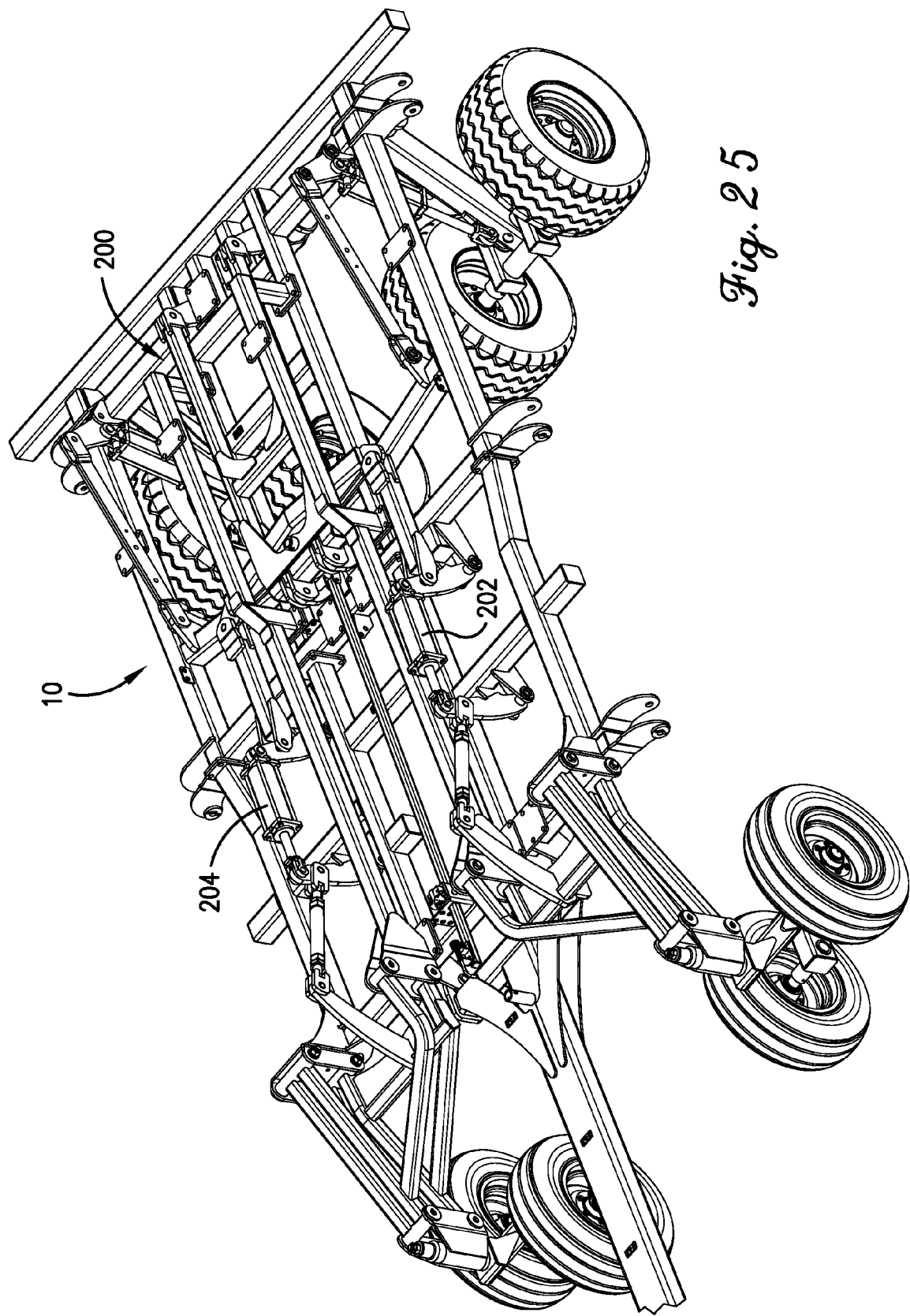
FIG. 25 is a left front isometric view of the center section showing an alternative embodiment of the linkage system between the rear lift wheels and the front gauge wheels.
Figure 26:
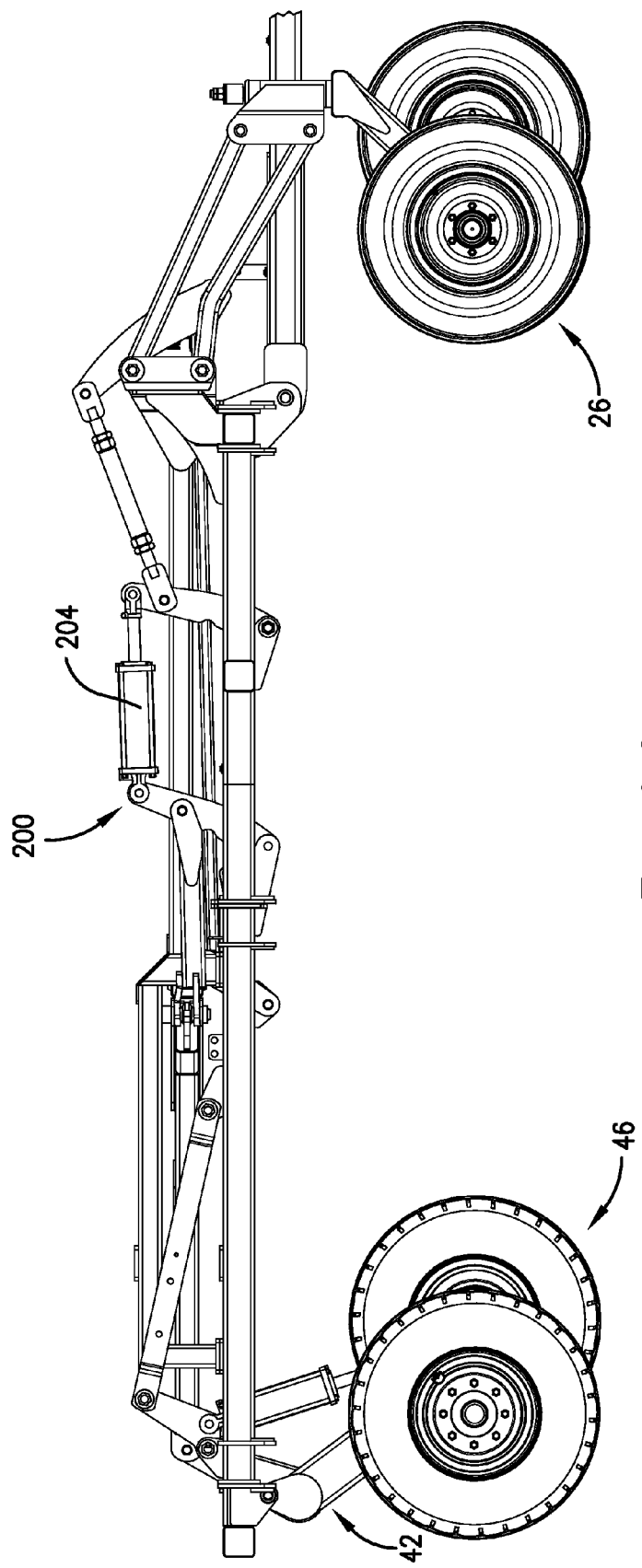
FIG. 26 is a right side elevational view of the center section with the alternative linkage system of FIG. 25.

FIGS. 25 and 26 illustrate an alternative embodiment wherein the linkage system 200 between front wheels 24, 26 and rear wheel assembly 42 includes a pair of rephasing hydraulic cylinders 202 and 204. Cylinders 202, 204 are operably coupled with opposite ends of the rocker bar 88 via shortened versions of the actuator arms or links 106 and 108 of the first embodiment. Rocker bar 88 allows the transfer of load from side-to-side to keep the load on front gauge wheels 24, 26 equal.

Another alternative embodiment of the linkage system between front wheels 24, 26 and rear wheel assembly 42 could substitute a pair of hydraulic cylinders for the rocker bar 88, pivot 90, and rocker support frame 86. Each cylinder would form part of a linkage from the rear torque bar 56 to the corresponding front wheel 24 or 26 and would be mechanically connected at its front end with the corresponding turnbuckle from the front wheel. Such cylinders would be charged with oil and plumbed in a closed loop in such a manner that retraction of one of the cylinders by a rising front wheel would cause extension of the other cylinder by an equal amount, keeping both front wheels on the ground and balancing the load. Yet, during actuation of the rear wheels to raise or lower the machine, the cylinders would not extend or retract but would instead simply perform as if they were rigid links.

The inventor hereby states his intent to rely on the Doctrine of Equivalents to determine and assess the reasonably fair scope of the present invention as it pertains to any apparatus not materially departing from but outside the literal scope of the invention as set forth in the following claims.

The invention claimed is:

1. A tillage implement comprising:
a substantially rigid main frame;
a floating hitch coupled to and extending forwardly from a front portion of said main frame with respect to a direction of travel of the main frame;
left and right front wheels positioned on opposite sides of an imaginary centerline of said main frame;
left and right rear wheels positioned on opposite sides of said imaginary centerline of said main frame;
a rear wheel support system coupling said left and right rear wheels to said frame; and
a front wheel support system coupling said left and right front wheels to said main frame,
wherein said front wheel support system is configured to allow non-corresponding shifting of said right and left front wheels relative to said main frame,
wherein said implement comprises a mechanical linkage system coupling said front and rear wheel support systems in a manner such that shifting of said rear wheels relative to said main frame causes shifting of said front wheels relative to said main frame,
said mechanical linkage system coupling said left and right front wheels in a manner such that shifting of one of said front wheels relative to said main frame causes shifting of the other of said front wheels relative to said main frame,
wherein said front wheel support system comprises a left front wheel support system for supporting said left front wheel and a right front wheel support system for supporting said right front wheel,
wherein said mechanical linkage system comprises a rocker bar configured to pivot relative to said main frame on a substantially upright rocker pivot axis,
said left and right front wheel support systems being mechanically linked to said rocker bar on opposite sides of said rocker pivot axis.

2. A tillage implement as claimed in claim 1,
wherein said rear wheel support system is shiftable relative to said main frame,
said rear wheel support system being mechanically linked to said rocker bar in a manner such that shifting of said rear wheel support system causes forward or rearward movement of said entire rocker bar, thereby causing forward or rearward movement of said rocker pivot axis.

3. A tillage implement as claimed in claim 2,
wherein said rear wheel support system comprises a torque bar, a left rear wheel support arm coupled to one end of said torque bar, and a right rear wheel support arm coupled to the other end of said torque bar,
said implement further comprising at least one main lift actuator coupled to said rear wheel support system in such a manner that actuation of said main lift actuator causes rotation of said torque bar and raising or lowering of said rear wheels relative to said main frame.

4. A tillage implement as claimed in claim 3,
wherein said mechanical linkage system comprises at least one extension arm coupled to and extending forwardly from said torque bar,
said mechanical linkage system comprising a rocker frame coupled to said rocker bar at said rocker pivot axis,
said mechanical linkage system comprising at least one rear transfer member coupled to and extending between said extension arm and said rocker frame in a manner such that movement of said extension arm causes movement of said rocker frame.

5. A tillage implement as claimed in claim 4,
wherein said mechanical linkage system comprises left and right actuator arms, left and right front transfer members, and left and right connection arms,
said left and right actuator arms being coupled to said rocker bar on opposite sides of said rocker pivot axis,
said left and right connection arms being coupled to said left and right front wheel support system respectively,
said left and right front transfer members being coupled between said left and right actuator arms and connection arms respectively.

6. A tillage implement as claimed in claim 1,
wherein said tillage implement is a field cultivator.

7. A tillage implement comprising:
a substantially rigid frame carrying a plurality of tillage tools for working the ground as the frame advances along a path of travel;
a pair of laterally spaced apart front wheels adjacent the front of the frame with respect to the direction of travel of the frame,
each of said front wheels being shiftably coupled with said frame for up and down movement relative to the frame;
a rear wheel assembly adjacent the rear of the frame with respect to the direction of travel of the frame,
said rear wheel assembly being shiftably coupled with said frame for up and down movement relative to the frame;
powered actuating mechanism operably coupled between said frame and said rear wheel assembly for raising and lowering said rear wheel assembly relative to the frame whereby to lift and lower the rear of said frame relative to the ground; and
a linkage system operably connecting said rear wheel assembly with said front wheels for transmitting up and down motion of said rear wheel assembly to said front wheels for causing the front of said frame to raise and lower simultaneously with the rear of said frame,
said linkage system including a front linkage extending rearwardly from said front wheels, a rear linkage extending forwardly from said rear wheel assembly, and a coupling interconnecting said front and rear linkages in a manner that permits said front wheels to shift upwardly or downwardly relative to one another in equal amounts and in opposite directions for maintaining the load of the front of the frame equalized on both of said front wheels as changes in terrain are encountered,
said coupling comprising a rocker bar pivotally attached to said rear linkage for rocking movement about a pivot axis located between opposite ends of said bar,
said front linkage comprising a pair of front links connected to respective ones of said front wheels and coupled with said rocker bar on opposite sides of said pivot axis,
said rear linkage including a rocker support frame at a forward end of the rear linkage,
said rocker support frame having a pivot connection with said rocker bar that defines said pivot axis of the rocker bar,
said pivot axis of the rocker bar being generally upright.

8. A tillage implement as claimed in claim 7,
said rocker support frame being swingably mounted on said frame of the implement for fore-and-aft movement of the rocker support frame and said rocker bar with said front and rear linkages during raising and lowering of said rear wheel assembly,
said rocker bar pivoting about said pivot axis relative to said rocker support frame during equal and opposite up and down shifting of said front wheels.

9. A tillage implement as claimed in claim 7,
a pair of front wheel support systems, each coupling a respective front wheel to said frame,
each of said front wheel support systems including a four-bar linkage connected to said frame of the implement for up and down swinging movement,
each of said front links being operably connected to a corresponding one of said four-bar linkages.

10. A tillage implement as claimed in claim 9,
each of said front wheels comprising a castor wheel.

11. A tillage implement as claimed in claim 7,
said rear wheel assembly including a transverse member pivotal about a transverse axis during raising and lowering of said rear wheel assembly and crank arm structure projecting laterally outwardly from said member,
said rear linkage being connected to an outer end of said crank arm structure such that said rear linkage shifts fore-and-aft during pivoting movement of said transverse member.

12. A tillage implement as claimed in claim 9,
said coupling including a pair of hydraulic cylinders connected between said rear wheel assembly and respective ones of said front wheel support systems,
said hydraulic cylinders being connected in closed loop fluid communication with one another in such a manner that fluid extends one cylinder and retracts the other during equal and opposite up and down shifting of said front wheels.

* * * * *